US012387412B2

(12) United States Patent
Fujisawa

(10) Patent No.: US 12,387,412 B2
(45) Date of Patent: Aug. 12, 2025

(54) DISPLAY METHOD OF A COMPOSITE IMAGE INCLUDING STACKED LAYER IMAGES IN WHICH A VISUAL EFFECT OF EACH LAYER IMAGE IS CHANGED

(71) Applicant: EXLAY WEBARTS INC., Tokyo (JP)

(72) Inventor: Nobuaki Fujisawa, Tokyo (JP)

(73) Assignee: EXLAY WEBARTS INC. (JP)

( * ) Notice: Subject to any disclaimer, the term of this patent is extended or adjusted under 35 U.S.C. 154(b) by 0 days.

(21) Appl. No.: 18/273,439

(22) PCT Filed: Dec. 20, 2022

(86) PCT No.: PCT/JP2022/046769
§ 371 (c)(1),
(2) Date: Jul. 20, 2023

(87) PCT Pub. No.: WO2023/127584
PCT Pub. Date: Jul. 6, 2023

(65) Prior Publication Data
US 2024/0346739 A1    Oct. 17, 2024

(30) Foreign Application Priority Data

Dec. 27, 2021   (JP) ................................ 2021-212354

(51) Int. Cl.
*G06T 13/80*   (2011.01)
*G06F 3/04815*   (2022.01)
*G06T 5/50*   (2006.01)

(52) U.S. Cl.
CPC .......... *G06T 13/80* (2013.01); *G06F 3/04815* (2013.01); *G06T 5/50* (2013.01); *G06T 2207/20221* (2013.01)

(58) Field of Classification Search
CPC . G06T 11/60; G06T 13/80; G06T 5/50; G06T 2207/20221; G06F 3/017; G06F 3/04815; G06F 3/04845
See application file for complete search history.

(56) References Cited

U.S. PATENT DOCUMENTS

| 11,061,551 B1* | 7/2021 | Gill ........................ G06F 3/0346 |
| 2005/0001853 A1* | 1/2005 | O'Donnell ............ G06T 15/503 |
| | | 345/629 |

(Continued)

FOREIGN PATENT DOCUMENTS

| JP | 2016197398 A | 11/2016 |
| JP | 2020166589 A | 10/2020 |

OTHER PUBLICATIONS

Pixlr, Understanding layers in Pixlr, 2015, https://students.cs.uri.edu/~forensics/courses/CSC101/assignments/pixlr/layers/index.html (Year: 2015).*

(Continued)

*Primary Examiner* — Phong X Nguyen
(74) *Attorney, Agent, or Firm* — Harness, Dickey & Pierce, P.L.C.

(57) ABSTRACT

According to an aspect of the disclosure, there is provide a computer implemented method including: receiving via a UI screen a first instruction to set a plurality of layer images and a response amount for a visual effect, the plurality of layer images being to be included in a composite image, the visual effect corresponding to an amount of a user operation specified by a user action for each of the plurality of layer images included in the composite image, the visual effect being applied regardless of selection of any one of the plurality of layer images; controlling a display device to display the composite image in which the plurality of layer images are stacked, the visual effect of each layer image being changed in response to the user action; and receiving (Continued)

a second instruction to store data, the data including the plurality of layer images or information indicating a location of the plurality of images and data indicating the response amount.

22 Claims, 21 Drawing Sheets

(56) References Cited

U.S. PATENT DOCUMENTS

| | | | | |
|---|---|---|---|---|
| 2008/0001950 A1* | 1/2008 | Lin | ................... | G06T 13/80 |
| | | | | 345/473 |
| 2008/0109751 A1* | 5/2008 | Fitzmaurice | .......... | G06F 3/0488 |
| | | | | 715/793 |
| 2008/0166069 A1* | 7/2008 | Lin | ................... | G06T 3/40 |
| | | | | 382/302 |
| 2009/0327888 A1* | 12/2009 | Woolf | .................. | G06Q 10/10 |
| | | | | 715/704 |
| 2010/0045691 A1* | 2/2010 | Naito | ................. | H04N 21/8146 |
| | | | | 345/581 |
| 2011/0191670 A1* | 8/2011 | Hoppenot | ............. | G06F 17/00 |
| | | | | 715/255 |
| 2012/0002903 A1* | 1/2012 | Wilensky | ............. | G06T 5/00 |
| | | | | 382/311 |
| 2013/0235069 A1* | 9/2013 | Ubillos | .............. | G06T 11/001 |
| | | | | 345/593 |
| 2013/0330021 A1* | 12/2013 | Bansal | ............... | G06T 11/60 |
| | | | | 382/309 |
| 2015/0063785 A1* | 3/2015 | Lee | ................... | G11B 27/031 |
| | | | | 386/280 |
| 2015/0294489 A1* | 10/2015 | Behzadi | ............. | G06F 3/0481 |
| | | | | 715/211 |
| 2015/0356758 A1* | 12/2015 | Sugawara | .............. | G06T 11/60 |
| | | | | 345/629 |
| 2016/0275366 A1* | 9/2016 | Yamamoto | ............. | G06T 3/02 |
| 2016/0292904 A1* | 10/2016 | Kim | ................... | G06T 13/80 |
| 2020/0394773 A1* | 12/2020 | Wilensky | ............. | G06F 3/0484 |
| 2022/0020126 A1* | 1/2022 | Zhen | ................... | G06T 5/92 |
| 2022/0245618 A1* | 8/2022 | King | ................... | G06T 13/80 |
| 2023/0097869 A1* | 3/2023 | Lin | ................... | G06T 5/60 |
| | | | | 382/156 |

OTHER PUBLICATIONS

Photoshop, Apply Same Styles (Effects) to Multiple Layers in Photoshop, Aug. 11, 2021, https://www.youtube.com/watch?v=wdJWVdEYsXE (Year: 2021).*

International Search Report and Written Opinion issued in PCT/JP2022/046769, mailed Mar. 7, 2023; ISA/JP (11 pages).

* cited by examiner

| | |
|---|---|
| NORMAL IMAGE PROCESSING | SIMPLE MOVEMENT EFFECT |
| | SIMPLE ROTATION EFFECT |
| | TRANSPARENT EFFECT |
| | X MOVEMENT EFFECT |
| | Y MOVEMENT EFFECT |
| | ROTATION EFFECT |
| | X SCALE EFFECT |
| | Y SCALE EFFECT |
| | X TILT EFFECT |
| | Y TILT EFFECT |
| CONFIGURATION PROCESSING | SIMPLE Z MOVEMENT EFFECT |
| | SIMPLE 3D ROTATION EFFECT |
| | Z MOVEMENT EFFECT |
| | LATERAL ROTATION EFFECT |
| | LONGITUDINAL ROTATION EFFECT |
| FILTERING PROCESSING | SIMPLE HUE EFFECT |
| | HUE EFFECT |
| | BRIGHTNESS EFFECT |
| | SATURATION EFFECT |
| | BLURRING EFFECT |

FIG. 7

| | | |
|---|---|---|
| COMPOSITE IMAGE ID | | |
| SERVER ID | | |
| CREATOR ID | | |
| LAYER [1] | LAYER [2] | ... |
| LAYER IMAEG ID | | |
| STORAGE LOCATION | | |
| POSITION INFORMATION | | |
| ORDER OF EXECUTION OF EFFECTS | | |

| | | | |
|---|---|---|---|
| NORMAL IMAGE PROCESSING | SIMPLE MOVEMENT EFFECT | | |
| | SIMPLE ROTATION EFFECT | | |
| | TRANSPARENT EFFECT | | |
| | X MOVEMENT EFFECT | | |
| | Y MOVEMENT EFFECT | | |
| | ROTATION EFFECT | ⋮ | ⋮ |
| | X SCALE EFFECT | | |
| | Y SCALE EFFECT | | |
| | X TILT EFFECT | | |
| | Y TILT EFFECT | | |
| CONFIGURATION PROCESSING | SIMPLE Z MOVEMENT EFFECT | | |
| | SIMPLE 3D ROTATION EFFECT | | |
| | Z MOVEMENT EFFECT | | |
| | LATERAL ROTATION EFFECT | | |
| | LONGITUDINAL ROTATION EFFECT | | |
| FILTERING PROCESSING | SIMPLE HUE EFFECT | | |
| | HUE EFFECT | | |
| | BRIGHTNESS EFFECT | | |
| | SATURATION EFFECT | | |
| | BLURRING EFFECT | | |

FIG. 10

| EXECUTION ORDER OF EFFECTS (HIGH LEVEL) |
|---|
| XY MOVEMENT |
| Z MOVEMENT |
| ROTATION |
| LATERAL ROTATION |
| LONGITUDINAL ROTATION |
| SIMPLE X MOVEMENT |
| SIMPLE Y MOVEMENT |
| SIMPLE Z MOVEMENT |
| SIMPLE ROTATION |
| SIMPLE LATERAL ROTATION |
| SIMPLE LONGITUDINAL ROTATION |
| SCALE |
| TILT |

FIG. 14A

| EXECUTION ORDER OF EFFECTS (HIGH LEVEL) |
| --- |
| XY MOVEMENT |
| Z MOVEMENT |
| ROTATION |
| LATERAL ROTATION |
| LONGITUDINAL ROTATION |
| SIMPLE ROTATION |
| SIMPLE X MOVEMENT |
| SIMPLE Y MOVEMENT |
| SIMPLE Z MOVEMENT |
| SIMPLE LATERAL ROTATION |
| SIMPLE LONGITUDINAL ROTATION |
| SCALE |
| TILT |

FIG. 14B

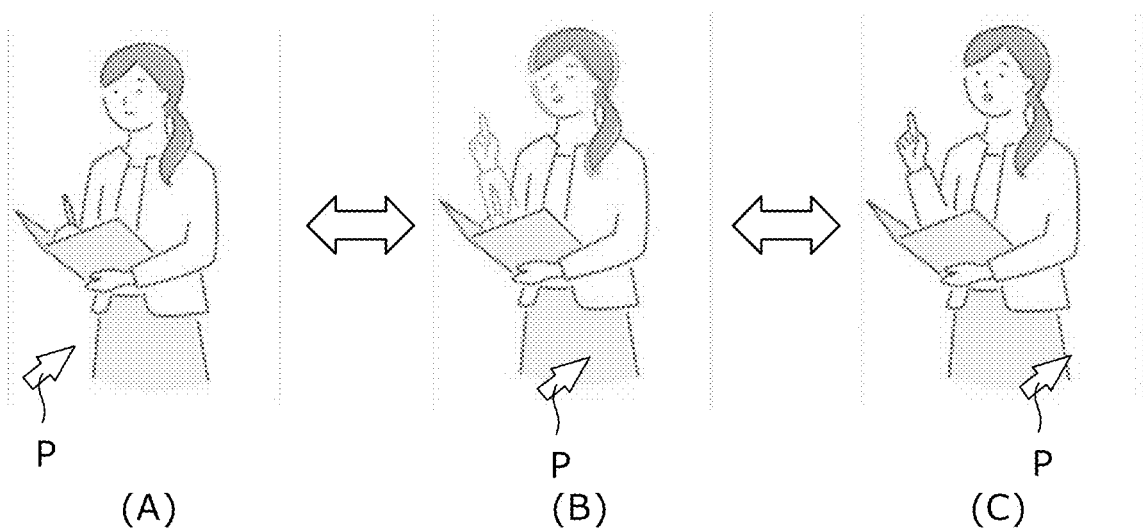
FIG. 16A
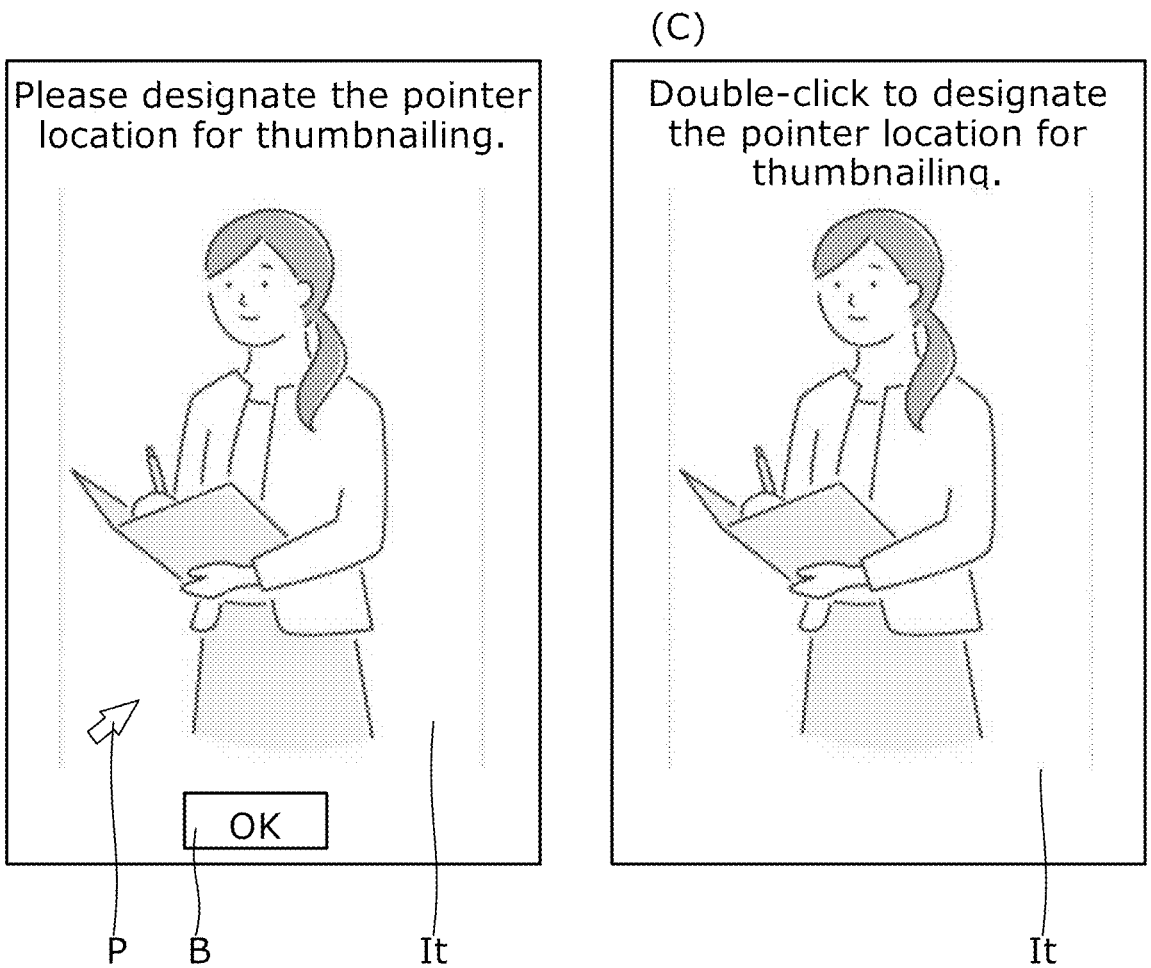
FIG. 16B
FIG. 16C

DISPLAY METHOD OF A COMPOSITE IMAGE INCLUDING STACKED LAYER IMAGES IN WHICH A VISUAL EFFECT OF EACH LAYER IMAGE IS CHANGED

CROSS REFERENCE TO RELATED APPLICATIONS

This application is a U.S. National Phase Application under 35 U.S.C. 371 of International Application No. PCT/JP2022/046769, filed on Dec. 20, 2022, which claims priority to Japanese Patent Application No. 2021-212354, filed on Dec. 27, 2021. The entire disclosures of the above applications are expressly incorporated by reference herein.

BACKGROUND

Technical Field

The present disclosure relates to a technique for generating, editing, and/or displaying a composite image that is a moving layered image.

Related Art

Techniques for displaying images generated on a computer are known. For example, JP 2020-166589A discloses an animation editing program for use in editing a subject of animation so as to change a plurality of attributes of an image object by way of a simple operation.

The service disclosed in JP 2020-166589A provides predetermined animation only, and a visual effect content corresponding to a user action cannot be freely set.

In contrast, the present disclosure provides a technique for generating a composite image with a visual effect corresponding to a user action set for each of a layer.

SUMMARY

According to an aspect of the disclosure, there is provide a computer implemented method including: receiving via a UI screen a first instruction to set a plurality of layer images and a response amount for a visual effect, the plurality of layer images being to be included in a composite image, the visual effect corresponding to an amount of a user operation specified by a user action for each of the plurality of layer images included in the composite image, the visual effect being applied regardless of selection of any one of the plurality of layer images; controlling a display device to display the composite image in which the plurality of layer images are stacked, the visual effect of each layer image being changed in response to the user action; and receiving a second instruction to store data, the data including the plurality of layer images or information indicating a location of the plurality of images and data indicating the response amount.

The visual effect may include a plurality of types of processes, in the receiving the first instruction to set the response amount of the visual effect, the first instruction is to set a plurality of types of visual effects for each of the plurality of layer images, and in receiving the second instruction to store the data, the second instruction may be to store the data indicating the response amount for the plurality of types of visual effects set in accordance with the first instruction.

The UI screen may include a first UI object for setting an order for executing the plurality of types of processes, and in receiving the second instruction to store the data, the second instruction may be to store the data including the information showing the execution order set via the first UI object.

The UI screen may include a first area and a second area, the first area being for preview of the composite image, the second area being for editing the response amount.

The UI screen may include a border line for the first area and the second area, the border line being movable in response to an operation made by the user.

The UI screen may switch from a screen on which one of the first area and the second area is displayed to another screen on which the other of the one of the first area and the second area is displayed, in response to an operation made by the user.

The UI screen may include a matrix, and the plurality of layer images may be arranged on one of rows and columns in the matrix, and the item of the visual effect is arranged on other of the one of rows and columns in the matrix.

The visual effect in one layer image among the plurality of layer images may include at least one of the following: a process of moving the one layer image in accordance with a vector having at least one of a first axis, a second axis, and a third axis component; a process of rotating the one layer image about a rotation axis having at least one of the first axis, the second axis, or the third axis component; a process of enlarging the one layer image along the first axis or the second axis; a process of changing the transparency of the one layer image; a process of changing the hue of the one layer image; a process of changing the brightness of the one layer image; a processing of changing the saturation of the one layer image; and a process of changing the sharpness of the one layer image.

The UI screen may include a second UI object for setting the content of the visual effect for each of a plurality of areas obtained by spatially dividing each layer image, and in receiving the second instruction to store the data, the second instruction may be to store the data including the identification information of the area and the content of the visual effect set via the second UI object.

The UI screen may include a third UI object for setting a division position for spatially dividing each of the plurality of layer images into the plurality of areas, and in receiving the second instruction to store the data, the second instruction may be to store the data including the information which shows the division position set via the third UI object.

The UI screen may include a fourth UI object for setting the response amount of at a reference position of the area for each of the plurality of areas, and in the receiving second instruction to save the data, the data may include the information which shows the response in the reference position set via the fourth UI object.

The UI screen may include, for each of the plurality of areas, a fifth UI object for setting a function for changing the response amount in the area; in receiving the second instruction to store the data, the second instruction may be to store the data including the information which shows the function set via the fifth UI object.

The UI screen may include a sixth UI object for specifying the amount of user operation which corresponds to the response amount of the visual effect in generating the thumbnail image of the composite image, and in receiving the second instruction to store the data, the second instruction may be to store the data including the information which shows the visual effect at the time of generating a thumbnail image set via the sixth UI object.

The plurality of layer images may include two layer images respectively having different sizes, the UI screen may include a seventh UI object for setting a positional relation of each of the two different sized layer images, and in receiving the second instruction to store the data, the second instruction may be to store the data including the information which shows the positional relation set via the seventh UI object.

According to another aspect of the disclosure, there is provided an information processing device including: a first receiving means for receiving via a UI screen a first instruction to set a plurality of layer images and a response amount of a visual effect, the plurality of layer images being to be included in a composite image, the visual effect corresponding to an amount of a user operation specified by a user action for each of the plurality of layer images included in the composite image, the visual effect being applied regardless of selection of one of the plurality of layer images; a display control means for controlling a display device to display the composite image in which the plurality of layer images are stacked, the visual effect of each layer image being changed in response to the user action; and a second receiving means for receiving a second instruction to store data, the data including the plurality of layer images or information indicating a location of the plurality of images and data indicating the response amount.

According to yet another aspect of the disclosure, there is provided a non-transitory computer-readable storage medium storing a program, the program causing a computer to execute a process, the process including: receiving via a UI screen a first instruction to set a plurality of layer images and a response amount of a visual effect, the plurality of layer images being to be included in a composite image, the visual effect corresponding to an amount of user operation specified by a user action for each of the plurality of layer images included in the composite image, the visual effect being applied regardless of selection of one of the plurality of layer images; controlling a display device to display the composite image in which the plurality of layer images are stacked, the visual effect of each layer image being changed in response to the user action; and receiving a second instruction to store data, the data including the plurality of layer images or information indicating a location of the plurality of images and data indicating the response amount.

According to yet another aspect of the disclosure, there is provided a computer implanted method, comprising: generating data of a UI screen for receiving a first instruction to set a plurality of layer images and a response amount of a visual effect, the plurality of layer images being to be included in a composite image, the visual effect corresponding to an amount of a user operation specified by a user action for each of the plurality of layer images included in the composite image, the visual effect being applied regardless of selection of one of the plurality of layer images; generating data for controlling a display device to display the composite image in which the plurality of layer images are stacked, the visual effect of each layer image being changed in response to the user action; and receiving an instruction to store data, the data including the plurality of layer images or information indicating a location of the plurality of images and data indicating the response amount.

According to yet another aspect of the disclosure, there is provided an information processing device including: a first generating means for generating data of a UI screen for receiving a first instruction to set a plurality of layer images and a response amount of a visual effect, the plurality of layer images being to be included in a composite image, the visual effect corresponding to an amount of a user operation specified by a user action for each of the plurality of layer images included in the composite image, the visual effect being applied regardless of selection of one of the plurality of layer images; a second generating means for generating data for controlling a display device to display the composite image in which the plurality of layer images are stacked, the visual effect of each layer image being changed in response to the user action; and a receiving means for receiving an instruction to store data, the data including the plurality of layer images or information indicating a location of the plurality of images and data indicating the response amount.

According to yet another aspect of the disclosure, there is provided a non-transitory computer-readable storage medium storing a program, the program causing a computer to execute a process, the process including: generating data of a UI screen for receiving a first instruction to set a plurality of layer images and a response amount of a visual effect, the plurality of layer images being to be included in a composite image, the visual effect corresponding to an amount of a user operation specified by a user action for each of the plurality of layer images included in the composite image, the visual effect being applied regardless of selection of one of the plurality of layer images; generating data for controlling a display device to display the composite image in which the plurality of layer images are stacked, the visual effect of each layer image being changed in response to the user action; and receiving an instruction to store data, the data including the plurality of layer images or information indicating a location of the plurality of images and data indicating the response amount.

According to yet another aspect of the disclosure, there is provided a computer implemented method including: displaying a screen on a display device; receiving an input of an amount of a user operation corresponding to a user action on the screen; controlling the display device to display a composite image in which a plurality of layer images are stacked, the composite image being displayed using data in which the plurality of layer images and a response amount of a visual effect is recorded, the visual effect corresponding to an amount of user operation specified by a user action for each of the plurality of layer images, the visual effect being applied regardless of selection of one of the plurality of layer images.

According to yet another aspect of the disclosure, there is provided an information processing device including: a display means for displaying a screen on a display device; a receiving means for receiving an input of an amount of a user operation corresponding to a user action on the screen; a controlling means for controlling the display device to display a composite image in which a plurality of layer images are stacked, the composite image being displayed using data in which the plurality of layer images and a response amount of a visual effect is recorded, the visual effect corresponding to an amount of a user operation specified by a user action for each of the plurality of layer images, the visual effect being applied regardless of selection of one of the plurality of layer images.

According to yet another aspect of the disclosure, there is provided a non-transitory computer-readable storage medium storing a program, the program causing a computer to execute a process, the process including: displaying a screen on a display device; receiving an input of an amount of a user operation corresponding to a user action on the screen; controlling the display device to display a composite image in which the plurality of layer images and a plurality of layer images are stacked, the composite image being displayed using data in which a response amount of a visual effect is recorded, the visual effect corresponding to an amount of user operation specified by a user action for each of the plurality of layer images, the visual effect being applied regardless of selection of one of the plurality of layer images.

Advantageous Effects

The present disclosure enables a composite image having a visual effect responding to a user action to be feely and easily generated for each of a layer.

BRIEF DESCRIPTION OF THE DRAWINGS

FIG. 7 details visual effects used in a composite image.

FIG. 10 shows an exemplary data structure of database 111.

FIGS. 14A and 14B show an exemplary screen for changing an order of implementation of effects.

FIGS. 16A-16C show an exemplary problem in generating a thumbnail image.

FIG. 18 C shows an exemplary screen for displaying a composite image.

FIG. 18 D shows an exemplary screen for displaying a composite image.

FIG. 18 E shows a n exemplary screen for displaying a composite image.

DETAILED DESCRIPTION

1. Configuration

Figure 1:
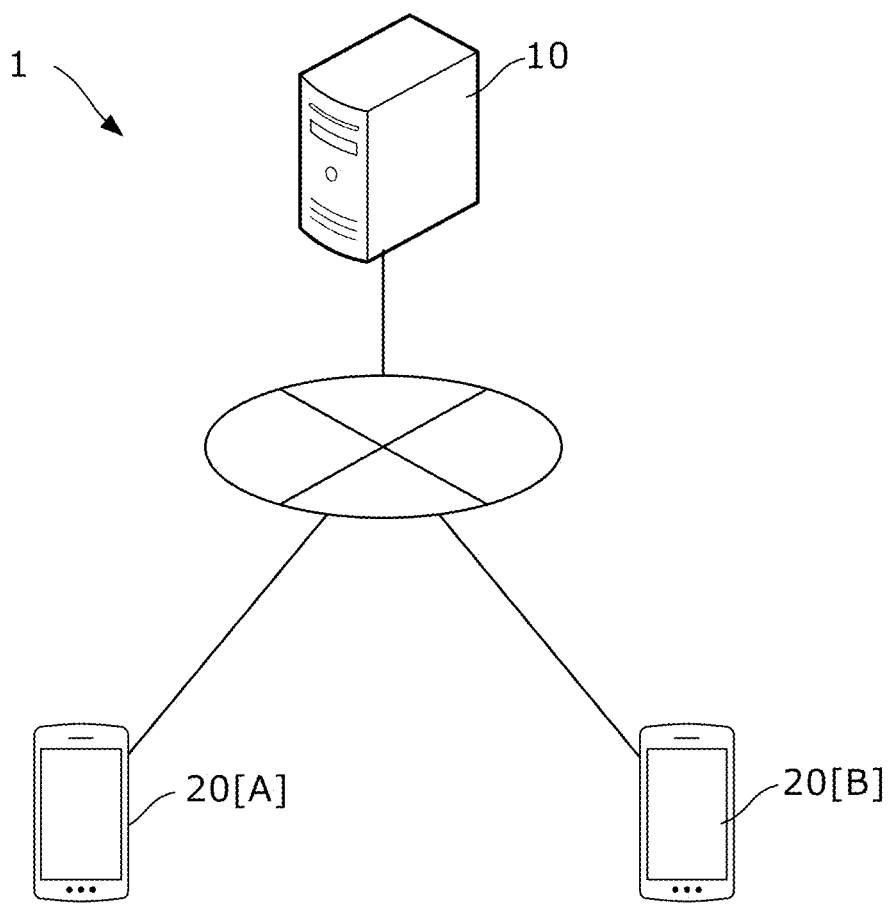
FIG. 1 shows an outline of an image display system 1 according to an embodiment.

FIG. 1 shows an outline of an image display system 1 according to an embodiment.

Image display system 1 is a system that provides an image editing and providing service (hereinafter, simply referred to as an "image service"), and includes server 10 and user terminal 20. User terminal 20 is a computer device that is used by a user of the image service to access server 10. Server 10 provides composite image data to user terminal 20. As described below, the composite image is a "movable layered image." For simplicity of illustration, image display system 1 shown in FIG. 1 includes only two user terminals 20. However, a plurality of terminals 20 in excess of two may be included. Subscripts are used to denote each of a plurality of user terminals 20, such as user terminals 20[A] and 20[B]. When there is no need to distinguish a plurality of user terminals 20 from each other, the user terminals are collectively referred to as user terminal 20.

Figure 2:
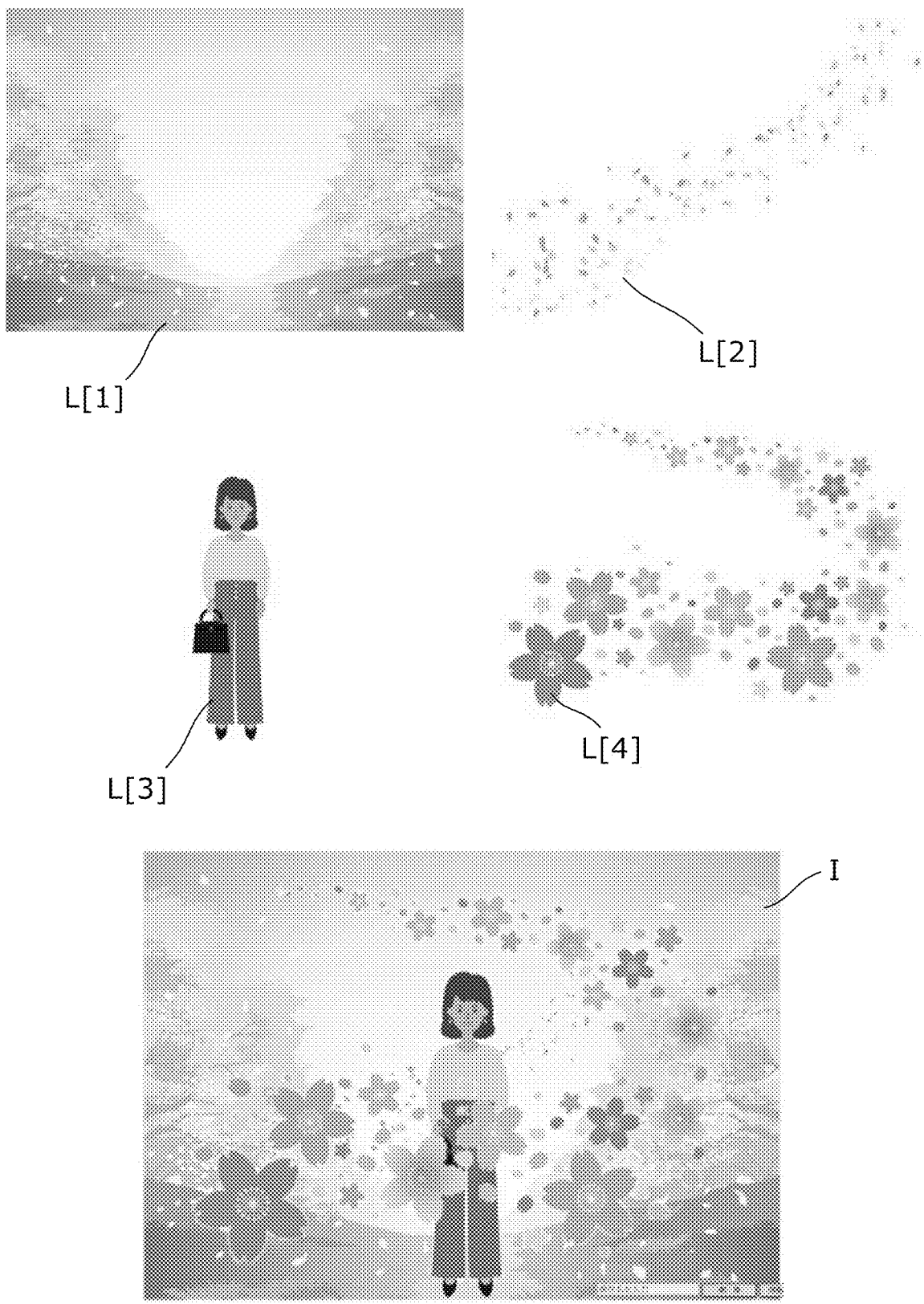
FIG. 2 shows a concept of a composite image.

FIG. 2 shows a concept of a composite image. The composite image I includes a plurality of layer images. Hereinafter, an image of an i-th layer from a lowermost surface is referred to as layer image L[i]. Further, a layer image that is not specifically denoted is simply referred to as a layer image L. In the example shown in FIG. 2, four layer images L are shown, and are denoted respectively as layer images L[1], L[2], L[3], and L[4]. In each layer image L, a defined visual effect changes in accordance with a user action (for example, movement of a cursor pointer) at user terminal 20. The user action is an input operation performed by the user at user terminal 20, and is, for example, cursor pointer movement, drag-and-drop, click, tap, swipe, or tilt of the terminal main body. For example, as the cursor pointer moves from left to right, layer image L[1] becomes less blurred after becoming more blurred, layer image L[2] moves to the right after moving to the left, layer image L[3] returns to its original size after becoming enlarged, and layer image L[4] moves to the left after moving to the right. Thus, in each layer image L a different visual effect (or image processing) occurs in response to an action by the user. As a result, an impression of complex change of composite image I as a whole is imparted to the user.

Figure 3:
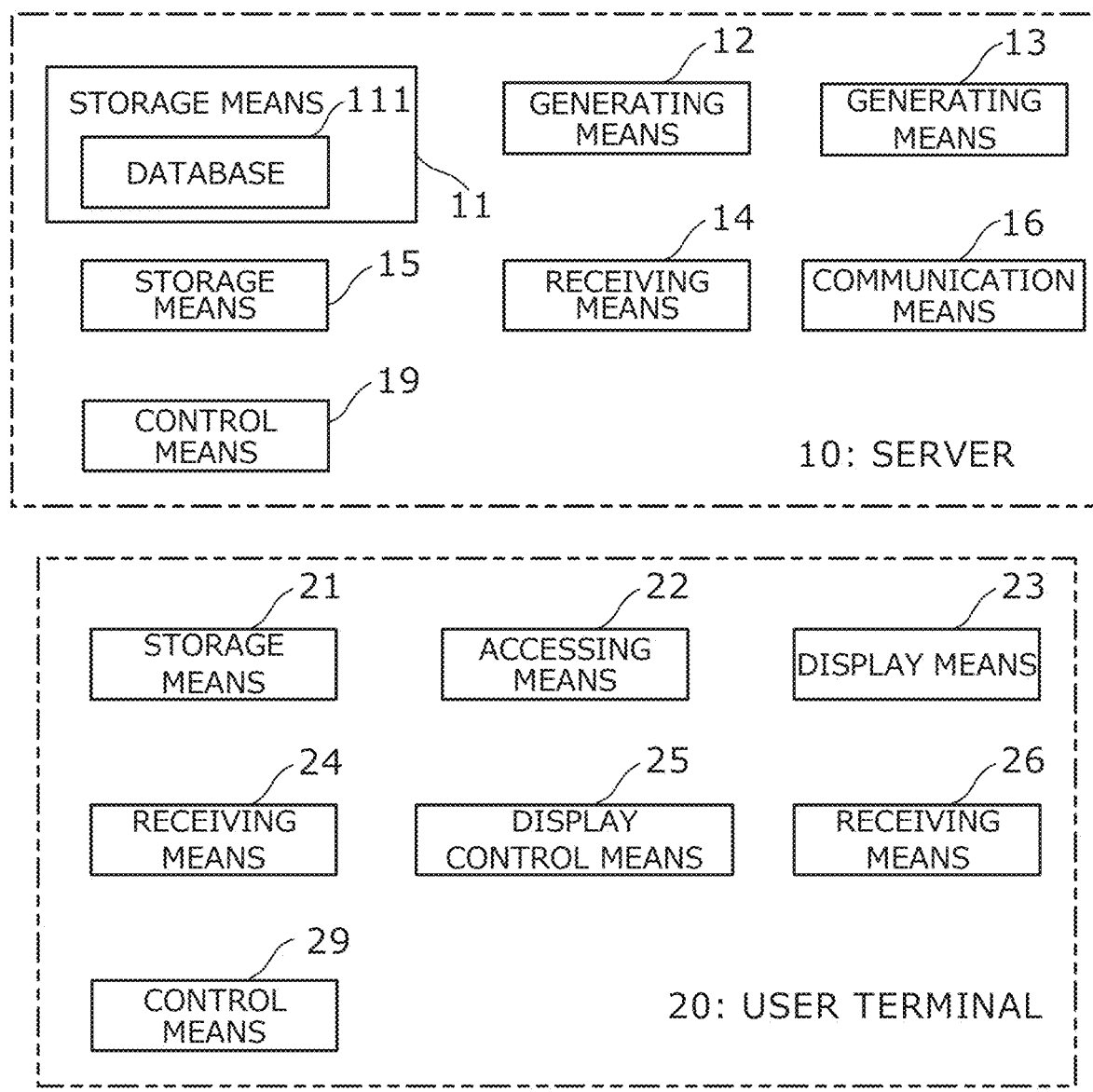
FIG. 3 shows an exemplary functional configuration of image display system 1.

FIG. 3 shows an exemplary functional configuration of image display system 1. Image display system 1 includes storage means 11, generating means 12, generating means 13, receiving means 14, storage means 15, communication means 16, control means 19, storage means 21, accessing means 22, display means 23, receiving means 24, display control means 25, receiving means 26, and control means 29. In this embodiment, storage means 11, generating means 12, generating means 13, receiving means 14, storage means 15, communication means 16, and control means 19 are implemented in server 10; and storage means 21, accessing means 22, display means 23, receiving means 24, display control means 25, receiving means 26, and control means 29 are implemented in user terminal 20.

Storage means 11 stores various data and programs. In this example, the data stored in storage means 11 includes database 111, which is a database for recording composite image data. Generating means 12 (an example of the first generating means) generates data for a UI screen that receives an instruction to set a plurality of layer images and a response amount of a visual effect in accordance with a user operation amount specified by a user action for each of a plurality of layer images included in a composite image. In this embodiment, the UI screen receives an instruction from user terminal 20 to set a plurality of types of visual effects in each of the plurality of layer images. The amount of the user operation specified by the user action is, for example, an amount of movement of a cursor pointer, a length of a flick or swipe, a duration or speed of the flick or swipe, or a degree of inclination of a terminal body. Generating means 13 (an example of the second generating means) generates data for displaying the composite image on the display means. Receiving means 14 receives an instruction to store data, the data including the plurality of layer images or information indicating a location of the plurality of images, and indicating a correspondence relationship, a response amount, and a type of visual effect. Storage means 15 stores the data in response to the instruction. More specifically, each of pieces of data (hereinafter referred to as "composite image data") are written into database 111 which is stored in storage means 11. Communication means 16 transmits or receives data to or from other devices. For example, communication means 16 transmits to user terminal 20 data for displaying the composite image indicated by the composite image data stored in database 111. Controlling means 19 performs various controls.

Storage means 21 stores various data and programs. Accessing means 22 accesses server 10. User terminal 20 receives (or acquires) from server 10 via accessing means 22 code for displaying the composite image and the images in the plurality of layers. Display means 23 displays a screen. Receiving means 24 (an example of the first receiving means) receives, via a UI screen, an instruction to set the plurality of layer images and a response amount of visual effects for the plurality of layer images included in the composite image in accordance with an amount of the user operation specified by a user action for each of the plurality of layer images. Display control means 25 controls display means 23 to display the composite image. Display control means 25 displays the composite image using the composite image data provided from server 10. Receiving means 26 receives an instruction to store data (or composite image data), the data including the plurality of images or information indicating locations of the plurality of images, and information indicating a response amount (an example of the second receiving means). Controlling means 29 performs various controls.

Figure 4:
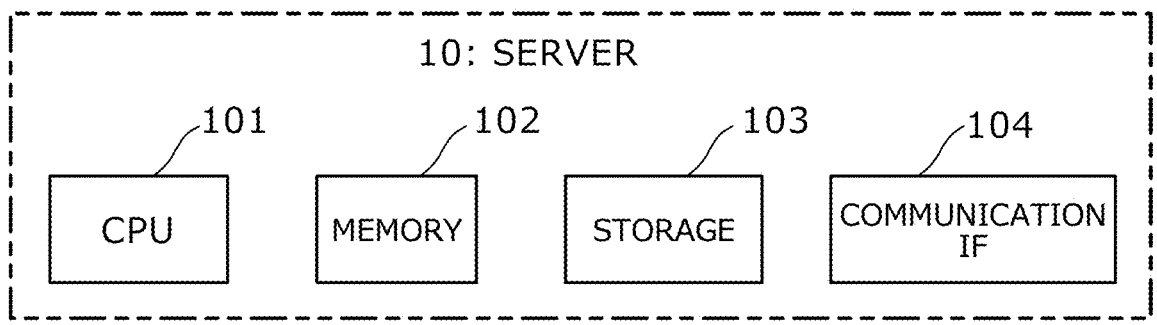
FIG. 4 shows an exemplary hardware configuration of server 10.

FIG. 4 shows an exemplary hardware configuration of server 10. Server 10 is a computer device (or an information processing device) that has a CPU (Central processor) 101, memory 102, storage 103, and communication IF 104. CPU 101 is a processor that performs various operations upon execution of a program. Memory 102 is a main storage device that functions as a work area when CPU 101 executes the program, and includes, for example, a RAM (Random Access Memory). Storage 103 is an auxiliary storage device that stores programs and data, and includes, for example, an HDD (Hard Disc Drive) or an SSD (Solid State Drive). Communication IF 104 is a device that communicates with other devices in accordance with a predetermined communication standard (e.g., Ethernet), and includes, for example, a NIC.

In this example, storage 103 stores a program (hereinafter referred to as a "server program") that causes a computer to function as server 10 in image display system 1. While CPU 101 is executing a server program, at least one of memory 102 and storage 103 acts as storage means 11. CPU 101 is an example of generating means 12, generating means 13, receiving means 14, storage means 15, and control means 19. Communication IF 104 is an example of communication means 16.

Figure 5:
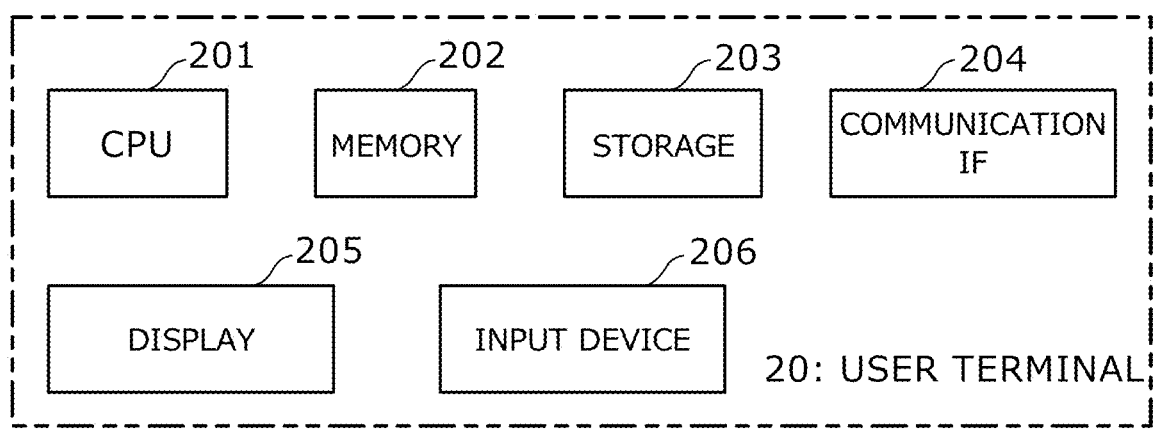
FIG. 5 shows an exemplary hardware configuration of user terminal 20.

FIG. 5 shows an exemplary hardware configuration of user terminal 20. User terminal 20 is a computer device, such as a smart phone or a personal computer that has a CPU 201, memory 202, storage 203, communication module 204, display device 205, and input device 206. CPU 201 is a processor that performs various operations upon execution of a program. Memory 202 is a main storage device and functions as a work area when CPU 201 executes the program, and includes, for example, a RAM. Storage 203 is an auxiliary storage device that stores programs and data, and includes, for example, an SSD. Communication module 204 is a device that communicates with other devices in accordance with a predetermined communication standard (for example, Wi-Fi and LTE), and includes, for example, a radio communication chip and an antenna. Display device 205 is a device for displaying data, and includes, for example, an LCD (Liquid Crystal Display) or an OLED (Organic Light-Emitting Diode) display. Input device 206 is a device for inputting an instruction or data from the user to user terminal 20 (or CPU 201), and includes, for example, at least one of a touch screen, a keypad, and a microphone.

In this example, storage 203 stores a program (hereinafter referred to as a "client program") that causes a computer to function as user terminal 20 (that is, a client) in image display system 1. Upon execution by CPU 201 of the client program, at least one of memory 202 and storage 203 acts as storage means 21. Communication module 204 is an example of accessing means 22. CPU 201 is an example of display control means 25 and control means 29. Display device 205 is an example of display means 23. Input device 206 is an example of receiving means 24. The client program may be either a general purpose web browser program or a dedicated application program.

2. Overview of Visual Effects

Before describing a visual effect, a relationship between layer image L and a frame will first be described. The frame is a virtual area for specifying an image to be displayed. A portion of each layer image L that overlaps the frame is separated out and displayed.

Figure 6:
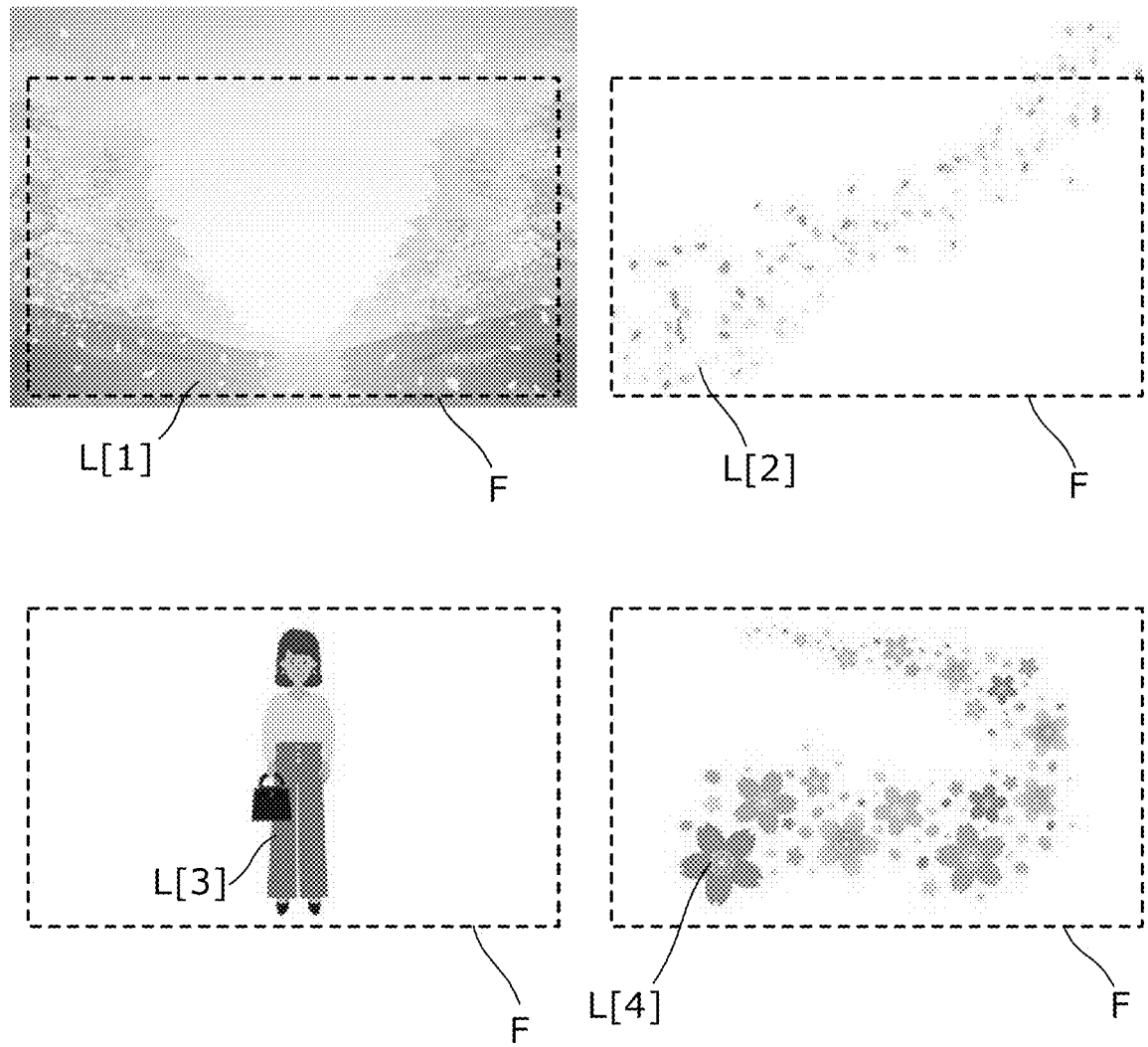
FIG. 6 shows a relationship between layer image L and a frame.

FIG. 6 shows an exemplary relationship between layer image L and frame F. Each layer image L is set to have a positional relationship with a frame F (more specifically, a reference point on the frame). Since the image displayed as the composite image is only a part that fits within frame F in each layer image, a size of each layer image L may differ, and may be larger or smaller than frame F. As described above, in the present embodiment, images of various sizes can be used as layer image L.

FIG. 7 details visual effects for use in a composite image. Before describing the operation of image display system 1, an overview of the visual effects will first be described. The visual effects are classified into different categories. More specifically, the visual effects are classified into three different categories: "normal image processing;" "stereoscopic image processing;" and "filtering processing" Each category includes one or more visual effects.

In this example, the category "normal image processing" includes "simple movement effect," "simple rotation effect," "transparent effect," "X movement effect," "Y movement effect," "rotation effect," "X scale effect," "Y scale effect," "X tilt effect," and "Y tilt effect." In the following description, an axis extending horizontally to the right of the screen in a state where the top and bottom of the screen are correctly aligned is referred to as an X-axis, an axis extending vertically is referred to as a Y-axis, and an axis defined in a right-hand system with respect to the X-axis and the Y-axis is referred to as a Z-axis. The X axis, the Y axis, and the Z axis are examples of the first axis, the second axis, and the third axis, respectively.

The "simple movement effect" is a process of changing a position of layer image L with respect to the frame in accordance with a position of the cursor pointer. More specifically, the simple movement is a process of changing the position of layer image L such that the displacement amount of the cursor pointer and the displacement amount of layer image L in the vertical and/or lateral direction are proportional to each other. Here, the "simple" movement effect is a fixed relationship in which a relationship between the displacement amount of the cursor pointer and a displacement amount of layer image L is a proportional relationship, and employs a simple setting method realized by relatively simple processing.

The "simple rotation effect" is a process of changing the rotation angle of layer image L centered on the rotation axis parallel to the depth (or axial) direction of the screen in accordance with the position of the cursor pointer. Specifically, the simple rotation effect is a process of changing the position of layer image L so that a displacement amount of the cursor pointer and a rotation angle of layer image L are proportional to each other. Here, the "simple" rotation effect is a fixed relationship in which the relationship between the displacement amount of the cursor pointer and the rotation angle of layer image L is proportional, and employs a simple setting method realized by relatively simple processing.

The "transparent effect" is a process for changing a transparency (or clearness) of layer image L in accordance with a position of the cursor pointer. The "X movement effect" is a process of changing the lateral position of layer image L in accordance with the position of the cursor pointer. The "Y movement effect" is a process of changing the position of layer image L in the vertical direction in accordance with the position of the cursor pointer. The "rotation effect" is a process of changing the rotation angle (when the rotation axis is the Z-axis) of layer image L in accordance with the position of the cursor pointer. The "X scale effect" is a process of changing the horizontal scale of layer image L in accordance with the position of the cursor pointer.

The "Y scale effect" is a process of changing the vertical scale of layer image L in accordance with the position of the cursor pointer. The "X tilt effect" is a process of tilting and deforming layer image L in the lateral direction, and is also a process of changing a tilt amount in accordance with the position of the cursor pointer. The "Y tilt effect" is a process of tilting and deforming layer image L in the vertical direction, and is also a process of changing the tilt amount in accordance with the position of the cursor pointer. For the "transparent effect," "X movement effect," "Y movement effect," "rotation effect," "X scale effect," "Y scale effect," "X tilt effect," and "Y tilt effect," the method of change and the position of the cursor pointer at which the effect is activated can be set in detail, as will be described in more depth later.

For example, in the process of moving layer image L in the lateral direction, two processes are prepared: "simple movement effect" and "X movement effect.". However, the "X movement effect" differs from the "simple movement effect" in that in the former a method of displacement and a position of the cursor at which the effect is activated can be set in detail. This is also applied to other movement effects. It is of note that the "X movement effect" and the "Y movement effect" are examples of a process of moving the layer image according to a vector having components of at least one of the first axis, the second axis, and the third axis.

In this example, the category "configuration processing" includes "simple Z movement effect." "simple three-dimensional rotation effect." "Z movement effect," "lateral rotation effect." and "longitudinal rotation effect." The "simple Z movement effect" is a process of changing the position of layer image L in the Z-axis direction in accordance with the position of the cursor pointer. Specifically, the simple Z movement effect is a process of changing the position of layer image L so that the displacement amount of the cursor pointer and the displacement amount of layer image L in the Z-axis direction are proportional to each other. Here, the "simple" movement effect is a fixed relationship in which the relationship between the displacement amount of the cursor pointer and the displacement amount of layer image L in the Z-axis direction is a proportional relationship, and the setting method is realized relatively simple processing. The "simple stereoscopic rotation effect" is a process of changing the rotation angle of layer image L with respect to the rotation axis parallel to the X axis or the Y axis in accordance with the position of the cursor pointer. Specifically, the simple stereoscopic rotation effect is a process of changing the position of layer image L so that the displacement amount of the cursor pointer and the rotation angle of layer image L are proportional to each other. Here, the "simple" stereoscopic rotation effect is a fixed relationship in which the relationship between the displacement amount of the cursor pointer and the rotation angle of layer image L is proportional, and the setting method is realized by relatively simple processing.

The "Z movement effect" is a process of changing the position of layer image L in the Z direction in accordance with the position of the cursor pointer. The "lateral rotation effect" is a process of changing the rotation angle of layer image L with respect to the rotation axis parallel to the Y axis in accordance with the position of the cursor pointer. The "vertical rotation effect" is a process of changing the rotation angle of layer image L with respect to the rotation axis parallel to the X axis in accordance with the position of the cursor pointer. For the "Z movement effect," "horizontal rotation effect," and "vertical rotation effect," the method of changing the position of the cursor pointer at which the effect is activated, and the like can be set in detail, as will be described in more depth later.

The group "filtering processing" includes a "simple hue effect," "hue effect," "brightness effect." "saturation effect." and "blurring effect." The "simple hue effect" and the "hue effect" are processes for changing a hue (or tone) of layer image L in accordance with the position of the cursor pointer. The "simple" hue effect is simpler than the "hue effect" in that the (numerical value) hue of layer image L and the position of the cursor pointer have a fixed proportional relationship. The "brightness effect" is a process of changing a brightness of layer image L in accordance with the position of the cursor pointer. The "saturation effect" is a process of changing a saturation of layer image L in accordance with the position of the cursor pointer. The "blurring effect" is a process of changing a sharpness of layer image L in accordance with the position of the cursor pointer. For each of the "hue effect," "brightness effect." "saturation effect," and "blurring effect," the method of change, the position of the cursor pointer at which the effect is activated, and the like can be set in detail, as will be described in more depth later.

It is note that the visual effects described above are merely examples. Only a part of the visual effects described above may be implemented, or visual effects other than those described above may be implemented.

3. Operation

Hereinafter, operation of image display system 1 will be described. The operation of image display system 1 can be broadly divided into two operations. One of which is to generate or edit a composite image, and the other of which is to view the composite image. Users of image display system 1 can be broadly divided into respective types of users based on their use of these two operations. One type of user generates or edits composite images, and the other type of user only views the composite images (in other words, is a user who neither generates nor edits the composite images). These two types of users are taken into account in the following description. User terminal 20[A] is a user terminal used by a user who generates or edits a composite image, while user terminal 20[B] is a user terminal used by a user who views a composite image. Operation of image display system 1 will be described with respect to each of creation or editing a composite image, and viewing the composite image.

In this example, image display system 1 requests user registration for a user who intends to generate or edit a composite image. Storage means 11 in server 10 has a user database (not shown in the figures), that stores information (account name, mail address, and the like) related to the user in the user database. Image display system 1 does not request user registration for users who only view composite images. That is, in this example, anyone can view the composite image.

3-1. Generating or Editing a Composite Image

Figure 8:
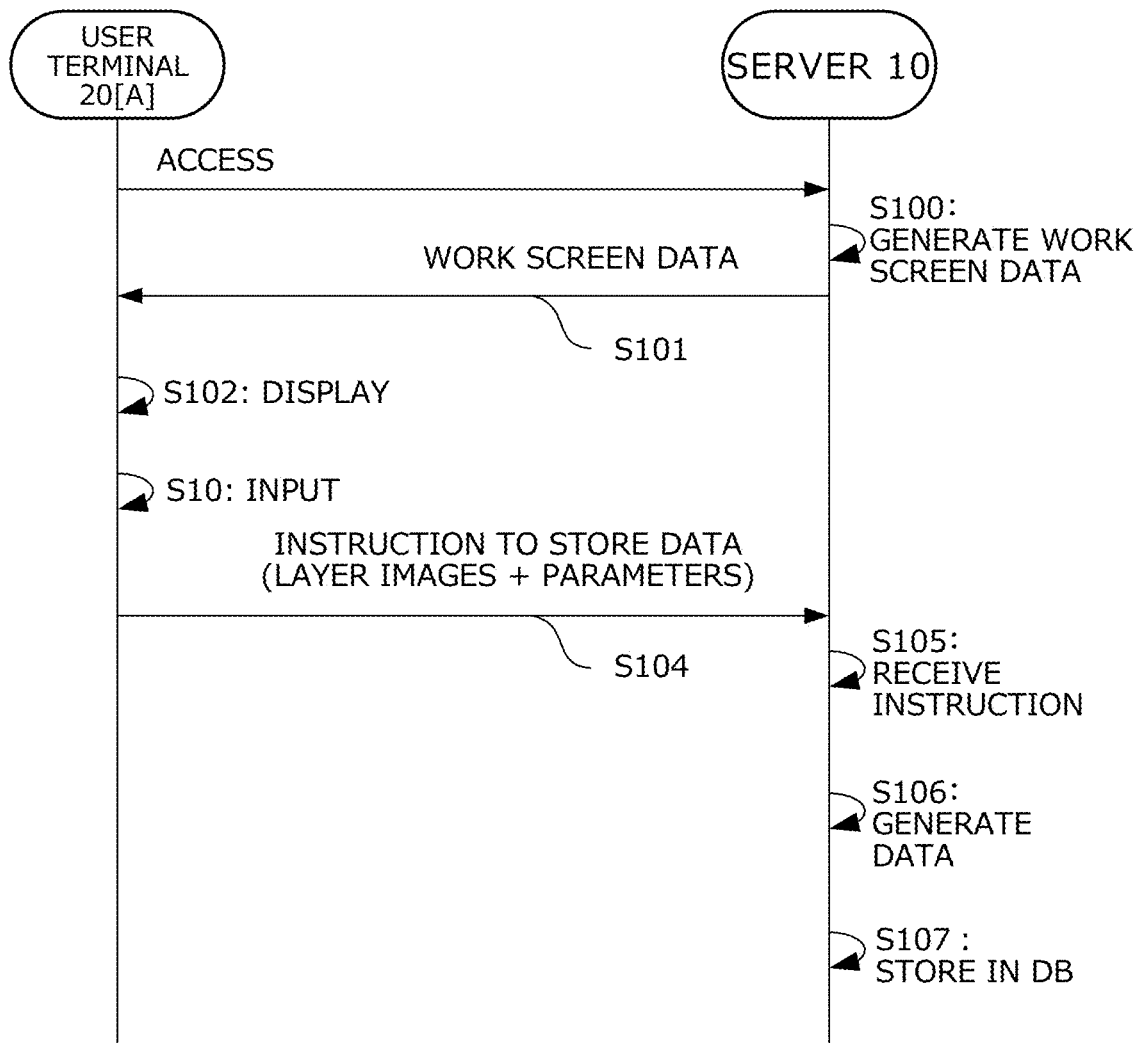
FIG. 8 shows an exemplary sequence chart illustrating an operation of image display system 1.

FIG. 8 shows an exemplary sequence chart illustrating an operation for generating or editing a composite image in response to an instruction from the user, user terminal 20[A] accesses server 10. In response to the access, server 10 transmits to user terminal 20[A] data for displaying the top screen of the image service. The top screen includes, for example, an image service menu, which includes items for generating a composite image and items for editing the composite image. Here, "generating" a composite image means generating a new composite image, while "editing" means modifying an existing composite image.

If the user instructs in the image service menu generation of a new composite image, control means 19 of server 10 generates a record of the new composite image in database 111. If the user instructs editing of an existing composite image in the image service menu, generating means 12 reads data of the composite image from database 111. Generating means 12 generates (at step S100) data for displaying a work screen (a UI screen) for generating or editing a composite image. Control means 19 transmits to user terminal 20[A] (at step S101) the generated data. In a case of editing an existing composite image, control means 19 also transmits to user terminal 20[A] data of the existing composite image. Display control means 25 in user terminal 20[A] controls (at step S102) display means 23 to display a work screen in accordance with the data.

Figure 9:
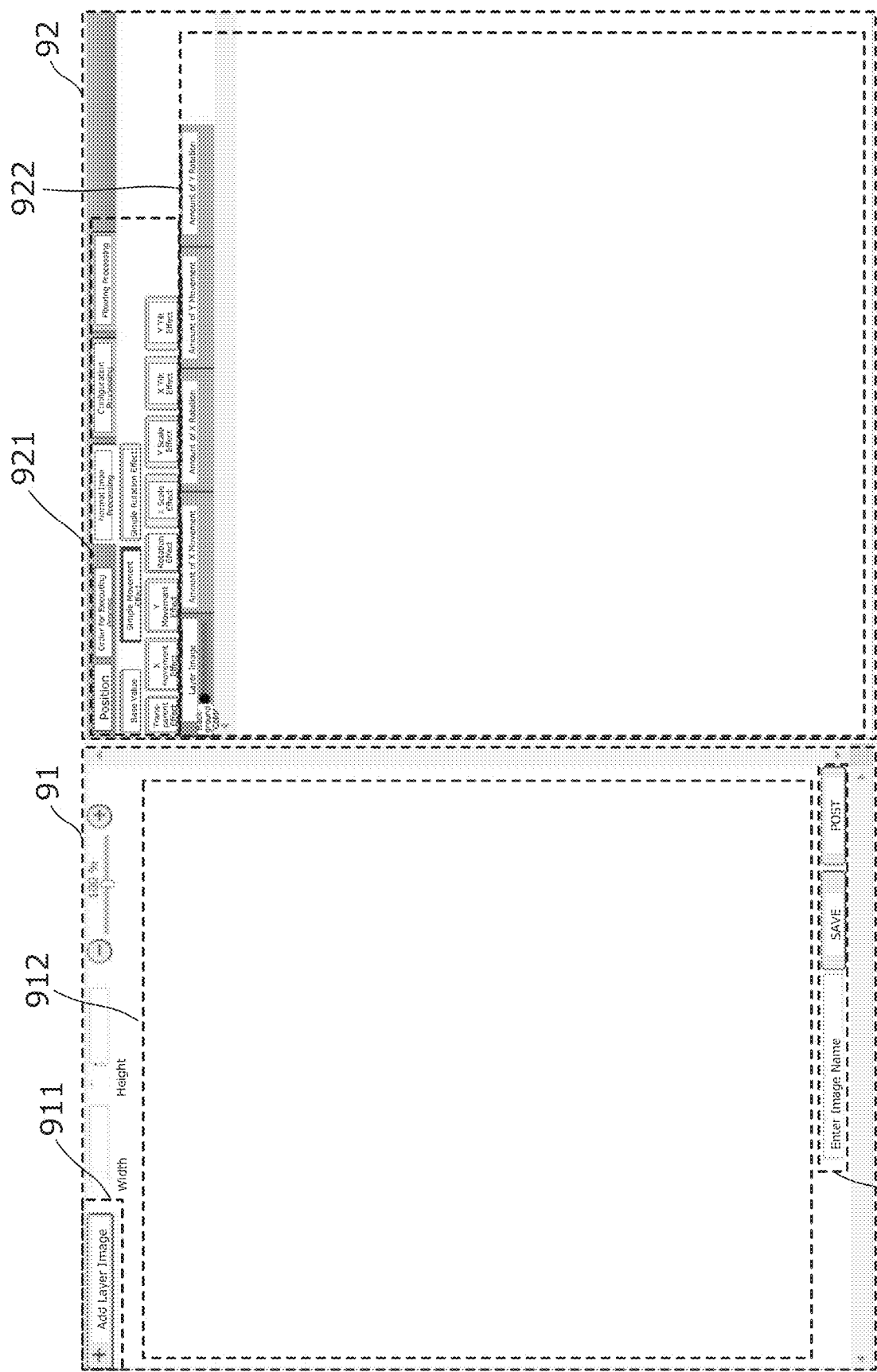
FIG. 9 shows an exemplary work screen.

FIG. 9 shows a work screen. The work screen includes area 91 and area 92. Area 91 is an area for preview display of a composite image being worked on. Area 91 includes UI object 911 at a predetermined position (in this case, at the upper portion). UI object 911 is a UI object (in this case, a button) for adding layer image L. Upon pressing this button, a dialog box for selecting a file is displayed. If the user selects an image file in accordance with the instruction in this dialog box, the selected image file is added as a new layer image L. Thus, by use of this dialogue box the user designates a file to be added as a new layer image L. Alternatively, the user can add new layer image L by dragging and dropping the image file into area 91.

Area 91 further includes area 912 and area 913. Area 912 is an area for preview display of a composite image being generated or edited. Area 913 is a UI object for instructing storage of the generated or edited composite images.

Area 92 is an area for displaying and inputting information related to each layer image L. The information relating to a layer image L includes, for example, a thumbnail image and a setting item of the layer image L. The setting item includes a type and content of a visual effect. For each visual effect, setting items are defined. Area 92 includes UI object 921 and area 922. UI object 921 is located at a predetermined position of area 92 (at an upper portion in this example). UI object 921 is a UI object for specifying a visual effect for changing the setting. In area 922, a UI object for setting the visual effects imparted to layer images L are displayed. Detailed description of the setting of the visual effect (or the setting of the response amount) via these UI objects will be given later.

In this example, the position of the border line can be changed for area 91 and area 92 by dragging the border line. That is, the sizes of area 91 and area 92 can be changed by user manipulation of the border line. Here, the user manipulation of the border lines of area 91 and area 92 is referred to as a user operation. In this example, when area 91 is extended to include the entire work screen (that is, when area 92 is not displayed), display control means 25 changes the preview display of the composite image in area 91 to a state optimized for viewing the composite image. Specifically, processes are initiated to (a) hide UI objects (e.g., buttons) disposed above and below area 92, (b) make opaque a translucent white frame that surrounds the composite image, and (c) hide guidance for the reactive area. Thus, the user is able to preview of the composite image in a state that is similar to an environment used for viewing the composite image by moving the border line between area 91 and area 92.

Area 91 is an example of a first area for preview display of the composite image. Area 92 is an example of a second area for editing the response amount and the type of visual effect. The border line between area 91 and area 92 is an example of the border line between the first area and the second area that moves responsive to and in accordance with the user operation.

Referring again to FIG. 8, receiving means 24 in user terminal 20[A] receives from the user (at step S103) input of a response amount of the visual effect. The response amount of the visual effect is a parameter for defining a response amount (or change amount) of the visual effect responsive to the user action. Here, the input of the response amount includes both new input of a response amount and correction of an already input response amount.

At step S104, control means 29 in user terminal 20[A] transmits to server 10 an instruction to store data for display of the composite images. The instruction includes information on the location of the layer image (or data of the layer image itself) and information on various response amounts. The process at step S104 is triggered by a predefined event. The predefined event is an event such that the user instructs upload of data to server 10. Alternatively, the predefined event may be, for example, an event of input of a value of a response amount.

Communication means 16 in server 10 receives from user terminal 20[A] (at step S105), an instruction to generate data for displaying the composite image. That is, communication means 16 receives the layer image and data indicating various response amounts. Generating means 13 generates (at step S106) data for displaying the composite image in user terminal 20 in accordance with the instruction. The data is provided in a predetermined format, and may be the data itself generated at step S203 as described later, or may be data that is a basis for data generated at step S203. Receiving means 14 stores (or writes) (at step S107) the layer images and the data of the various response amounts in database 111 in storage means 11.

FIG. 10 shows an exemplary data structure of database 111. Database 111 includes a plurality of records. One record indicates one composite image. Each record has a composite image ID and a server ID. The composite image ID is identification information for specifying the composite image, and is automatically assigned by, for example, control means 19. The server ID is the identity of the server storing the layer image file. Each record further has a creator ID. The creator ID identifies the user who generated the composite image.

Each record has a plurality of sub-records. One sub-record indicates one layer image L. That is, each sub-record has a layer image ID. The layer image ID is identification information for identifying a layer image. Each sub-record also includes information on a position and an order of execution of effects. The position information indicates an initial value of a positional relationship between layer image L and the frame. The information on the order in which the effects are executed indicates the order in which a plurality of visual effects is applied to the layer image. Each sub-record further has, for each of the plurality of visual effects, information (or a response amount) indicating the content thereof.

Although not shown in the figures, each record may also have a tag indicating the content of the composite image (for example, the creator name, the scene being drawn, the title of the image, the character name, and the like).

3-2. Visual Effects Settings Details

Figure 11:
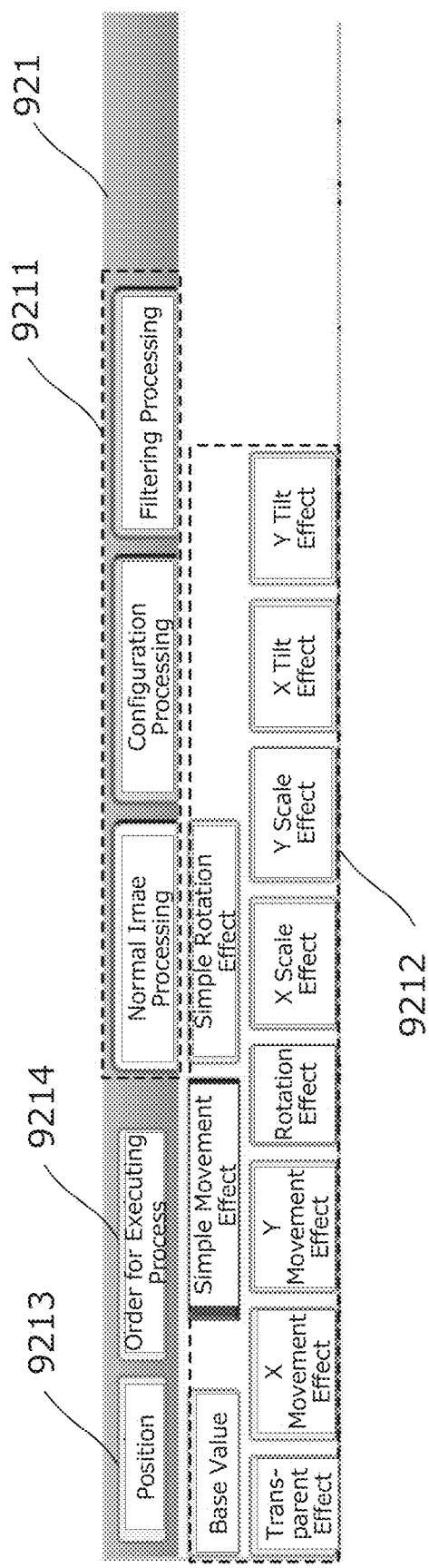
FIG. 11 shows an exemplary UI Object 921.

FIG. 11 shows an exemplary UI object 921. UI object 921 includes UI object 9211 that designates a group of visual effects and UI object 9212 that designates a visual effect of one of the visual effects belonging to the designated group. In this example, UI object 9211 is a tab and UI object 9212 is a button. Buttons for setting visual effects belonging to the group selected in UI object 9211 are displayed as UI object 9212 (buttons for setting visual effects belonging to the group not selected in UI object 9211 are not displayed).

Figure 12A:
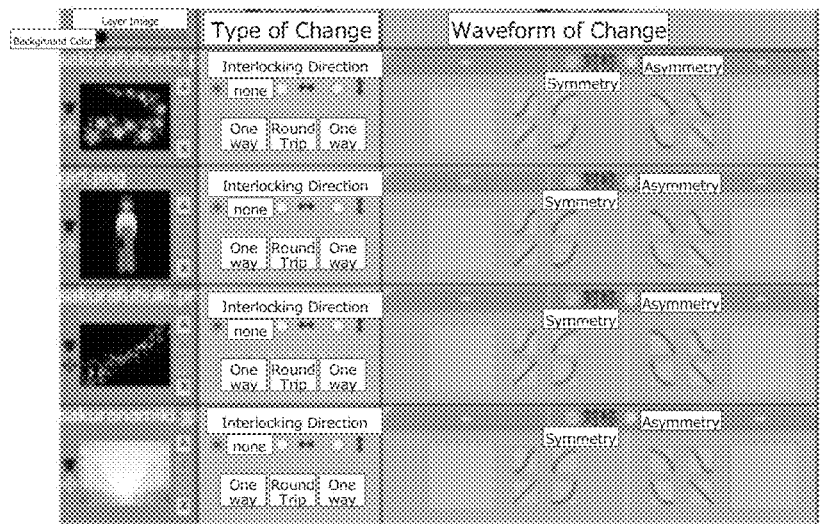
FIGS. 12A-12C show an exemplary setting information for a visual effect on layer image L.
Figure 12B:
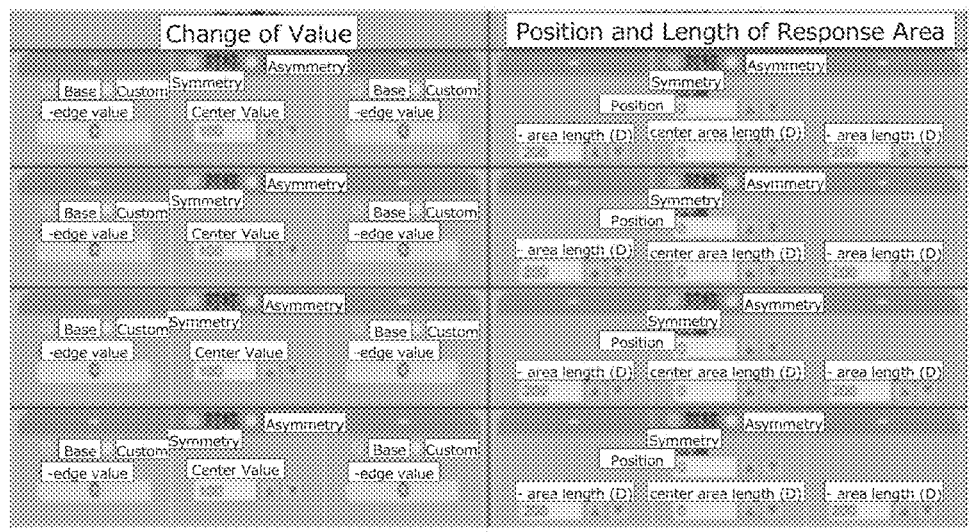
Figure 12C:
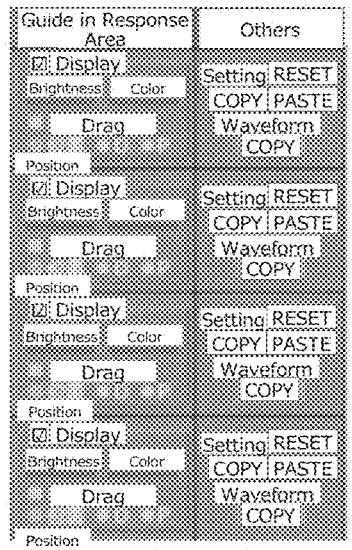

FIGS. 12A-12C show an exemplary visual effect related to layer image L displayed in area 922. In this example, the setting information for layer image L is displayed in a matrix form. In FIGS. 12A-12C, for simplification of illustration, the setting information is divided into three blocks. In practice, the block shown in FIG. 12B is located at the right end of the block shown in FIG. 12A, and the block shown in FIG. 12C is located at the right end of the block shown in FIG. 12B. In this matrix, the i-th row excluding the uppermost row in which the setting item name is displayed includes the setting information for layer image L[i]. In the column direction of the matrix, a UI object for setting a response amount related to the visual effect is arranged. The setting item for setting the response amount related to the visual effect varies depending on the selected visual effect. This matrix is an example of the second UI object that sets a response amount for each of a plurality of areas obtained by spatially dividing each of the plurality of layers. In this instance, the composite image data includes the identification information of the area and the response amounts set for the area.

In this example, the response amount for the visual effect includes "type of change," "waveform of change," "change of value," "position and length of the response area," and "display guide of the response area." The response area is an area that spatially divides layer image L or frame F, and is an area in which a visual effect of layer image L changes when the cursor pointer enters the area.

The "type of change" is a setting related to a direction of movement of the cursor pointer that changes a visual effect. "Type of change" specifically includes an "interlocking direction" and a "response area overview." The "interlocking direction" is a direction of movement of the cursor pointer corresponding to a change in the visual effect. In this example, the "interlocking direction" includes three alternatives: "none," "Right/Left." and "Up/Down." If "none" is selected, no linkage between the movement of the cursor and the visual effect occurs, i.e., a visual effect is not applied. If "Left/Right" is selected, the visual effect changes in accordance with a change in the X coordinate of the cursor pointer (the visual effect does not change in accordance with the change in the Y coordinate). If "Up/Down" is selected, the visual effect changes in response to a change in the Y coordinate of the cursor pointer (the visual effect does not change in response to a change in the X coordinate). As will be described later, it is also possible to set both "Left/Right" and "Up/Down" for one layer image L as an interlocking direction.

Further, the "the response area overview" indicates a state in which the response amount of the visual effect increases or decreases relative to movement of the cursor pointer. In this example, the response area is divided into three areas constituted of one end side area, a center area, and another end side area in the interlocking direction. For these three areas, (a) one end side end point of one end area, (b) the center side end point of one end side area, which equals one end side end point of the center area, (c) the another end side end point of the center area, which equals the center side end point of the other end area, and (d) the other end side end point of the other end area. For each of these areas there are four borders in total. In this example, the response amount value in the center area remains constant regardless of a position of the cursor pointer. In each item described below, how a response amount value changes in these areas is set.

In this example, in the "response area overview" when the interlocking direction is left and right there is one way (left) and one way (right), and when the interlocking direction is up and down, there is a three-way choice of one way (up), round trip, and one way (down). "One-way (left)" means that the width of the right area is set to zero. That is, the response area is substantially divided into two areas: the left area and the center area. "One-way (right)" means that the width of the left area is set to zero. That is, the response area is substantially divided into two areas: the center area and the right area. "Round-trip" means that the width of the left area and the right area is set to a non-zero value.

The "waveform of change" is a response amount that defines a profile of an amount of change in a visual effect responsive to displacement of the cursor pointer (i.e., how much the visual effect changes when the cursor pointer is displaced). In this example, it is first specified whether the waveform of change is symmetrical or asymmetrical in the interlocking direction. Here, symmetrical means that the profile of one end side area and the profile of the other end side area are symmetrical relative to the center area. In this instance, the work screen receives one waveform for one only of the one-end side area and the other-end side area, and another waveform is automatically generated from the one waveform. Asymmetrical means that the profile of the one-end area and the profile of the other-end area are asymmetric relative to the center area. In this case, the work screen receives a waveform for the one-end side area and a waveform for the other-end side area.

After receipt of the symmetric/asymmetric waveform, the work screen presents a change shape option for each area. In this example, the options include linear, Bezier curve, logarithmic, and exponential forms. Further, for S-shaped, logarithmic, and exponential forms, the work screen receives a change in shape (e.g., curvature) of the curve. In one example, the shape of the curve is changed by the user specifying the position of the reference point (e.g., the control point in the Bezier curve) by dragging and dropping. If the waveform is "asymmetric," the work screen receives the setting of the waveform individually in the one-side area and the other-side area. The user can also set the profile, for example, by setting a logarithmic change in the left area and a linear change in the right area. A UI object for setting a "waveform of change" is an example of a fifth UI object for setting a function for changing a response amount in each of a plurality of areas. In this instance, the composite image data includes information indicating a function for changing a response amount in an area.

"Change in value" indicates a representative value of a response amount of a visual effect in the waveform of the change. In this example, the representative value is a value of the response amount at a reference position of each area, more specifically, a value of the response amount at the four borders (A) to (D). The representative value of the response amount can be selected from "Base" and "Custom," respectively. If "Base" is selected, the value of the response amount at the end point thereof is set to a default value (e.g., zero). If "Custom" is selected, the user can enter a numerical value for the response amount at an end point. For an end point for which "Custom" is selected, a check box "Keep Out of Area" is further provided. If this check box is checked, the value of the response amount at the end point is maintained when the cursor pointer moves out of the response area. If the check box is left unchecked, the value of the response amount is returned to the initial value when the cursor pointer moves out of the response area. The UI object for setting the "change in value" is an example of a fourth UI object for setting a value of a response amount at a reference position of each of a plurality of areas. In this instance, the composite image data includes information indicating the value of the response amount at the reference position.

The "position and length of the response area" is a setting that defines a size of the response area. The visual effect does not change as the cursor pointer moves outside the response area. The shape of the response area may be selected as either "symmetric" or "asymmetric." If "symmetric" is selected, only UI objects that set the width of the center area and the width of the one-end area becomes active, and the width of the other-end area is set to be the same as the one-end area. If "asymmetric" is selected, the width of each of the one-end area, the center area, and the other-end area can be set. For example, if the interlocking direction is left and right, the response area is divided into a left area, a center area, and a right area. The user can enter the width of each area numerically. With respect to the center area, the position (in particular, the position (e.g., the center) of the reference point of the center area) can be set. The position and length of the response area are specified pixel units, for example. The UI object for setting the "position and length of the reactive area" is an example of a third UI object for setting a division position for spatially dividing the respective layer images into a plurality of areas. In this instance, the composite image data includes information indicating the set division position.

The change in the response area and the visual effect described above will now be described by way of specific examples.

Figure 13:
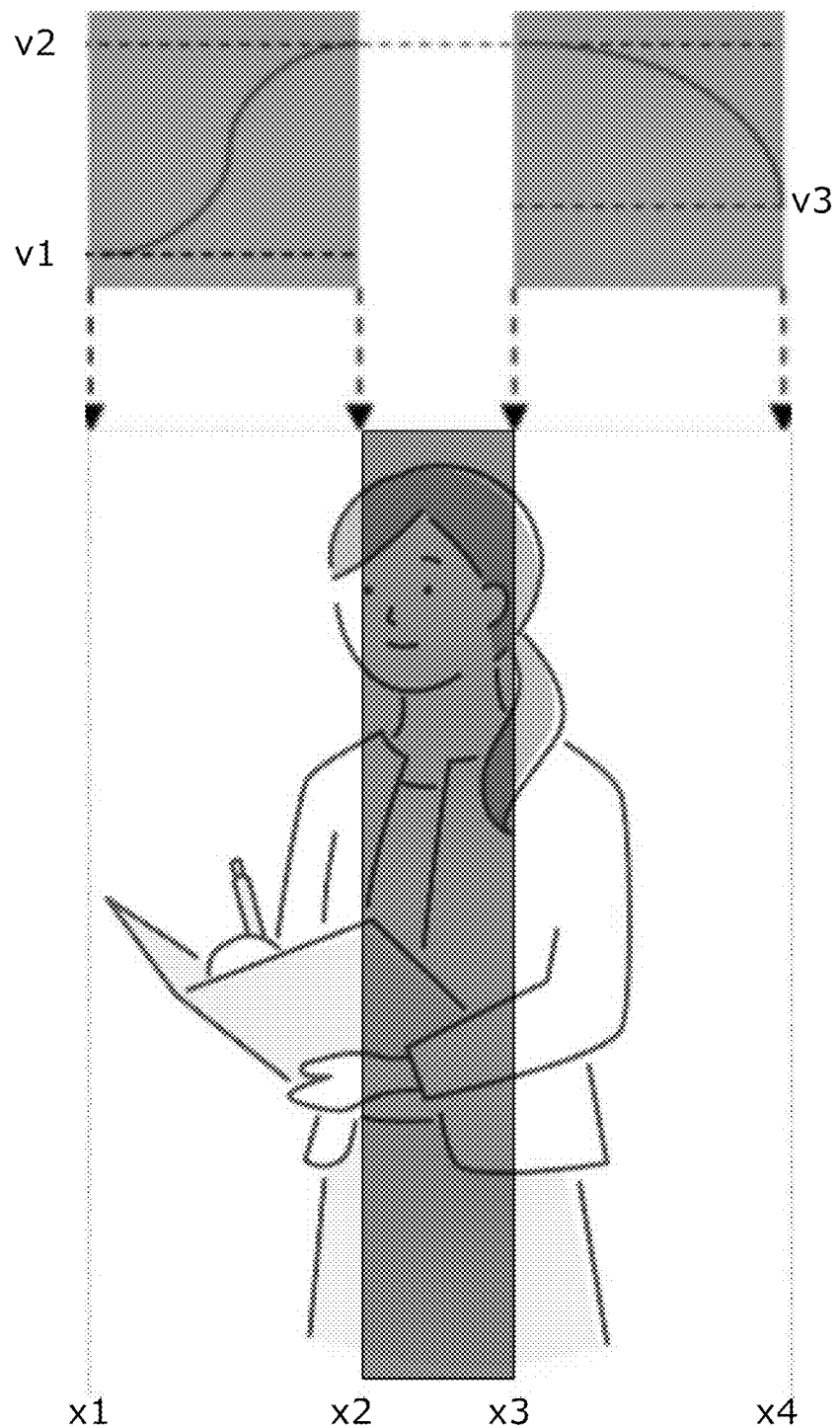
FIG. 13 shows an exemplary response area in layer image L.

FIG. 13 shows an exemplary response area in layer image L. The response area is divided into three areas in the interlocking direction: one end side area, the center area, and the other end side area. In this example, the lateral direction is the interlocking direction, and the response area is divided into three areas: a left area, a center area, and a right area. The waveform of the change in the left area is set to an S-shape, the waveform of the change in the center area is set to a constant, and the waveform of the change in the right area is set to a logarithmic function. The value v of the response amount in each area is as follows:

Left area: $v=fL(x)$ where $x1 \leq x \leq x2$;
Center area: $v=fC(x)$ where $x2 \leq x \leq x3$; and
Right area: $v=fR(x)$ where $x3 \leq x \leq x4$,
where the x coordinate is the x coordinate in the coordinate system relative to frame F (e.g., with the lower left vertex of frame F as the origin). The response amounts at each border are as follows;

if $x=x1$ then $v=v1$,
if $x=x2$ then $v=v2$,
if $x=x3$ then $v=v2$, and
if $x=x4$ then $v=v3$.

For example, when the position xm of the mouse cursor is $x1 \leq xm \leq x2$ (when the mouse cursor is in the left-hand area), the response amount v is $v=fL(xm)$. When the visual effect is an X movement effect, the value v of the response amount represents the movement amount in the X-axis direction.

3-3. Detail of UI

Referring again to FIG. 12, the "Display guide of response area" is a setting related to display of a guide indicating a position of the response area on the preview display of the composite image of area 91. If a guide is to be displayed, a setting that specifies its appearance (brightness and color in this example) is included in "Display guide of response area." This guide display can be set for each visual effect and for each response area. Therefore, even when a plurality of visual effects are applied to one layer image and the response areas in each visual effect are different, the work screen can separately display each response area.

The information regarding layer image L in area 92 includes an item "other operations." Other operations include resetting, copying, and pasting set points (or response amounts), and duplicating waveforms. The copy and paste function is useful when a plurality of different visual effects is set to have the same setting. For example, to set an effect of moving obliquely 45 degrees on the XY plane, it is necessary to set the same response amount for both the X movement effect and the Y movement effect. In this case, a user can proceed as follows: input the response amount for the X movement effect; copy the response amount; switch to the input screen for the Y movement effect; and paste the response amount. In this way, the same response amount as the X movement effect is input and applied to the Y movement effect.

The "layer image" is an area for displaying a thumbnail image of each layer image. A slide bar for changing the background color of the thumbnail image is provided under the title "layer image." The user can select the background color by moving the slide bar. A button for switching the display/non-display of the layer image in area 91 is provided next to each thumbnail image. The user can switch the display/non-display of the layer image by pressing this button. A button for adjusting the positional relationship between the frame and the layer image is provided next to each thumbnail image. The user can press this button for any of the plurality of layer images. A layer image that is in the ON state can change positional relationship with the frame (that is, the positional relationship with other layer images) by dragging and dropping (or touching and sliding) in area 92. This is an example of the seventh UI that sets the positional relationship of each of the two different-sized layer images.

Referring again to FIG. 11, UI object 921 includes UI object 9213 and UI object 9214. UI object 9213 is a button for setting an initial position relation between layer image L and the frame. When this button is pressed, a UI object (another example of the seventh UI object) is displayed in area 92 for setting a positional relation between layer image L and the frame with a numerical value that indicates a coordinate deviation. The positional relationship between layer image L and the frame is represented by coordinates of a predetermined position of layer image L (for example, the center of layer image L in the X direction and the Y direction) with reference to a predetermined position of the frame (for example, the center of the frame in the X direction and the Y direction). Thus, the UI object enables the user to set a positional relationship for each of the different-sized layer images.

UI Object 9214 is a button that is used for setting an order of execution of effects. The order of execution of effects is information that indicates the order in which the visual effects are executed. Although it is possible to set a plurality of visual effects for one layer image L, a combination of the same visual effects may provide different results depending on an order of execution. Accordingly, the execution order is specified in database 111. If the user instructs a change in an order of execution of an effect via UI object 9214 (for example, by pressing a button), a screen for changing the execution order of the effect is displayed.

FIGS. 14A and 14B show an exemplary screen for changing an execution order of effects. FIG. 14A illustrates a screen before the change. In this example, image objects representing respective visual effects are vertically stacked. A visual effect corresponding to an image object that is located higher is applied earlier. The user can change the order of the image objects by using a drag and drop operation. FIG. 14B illustrates a screen after the execution order is changed. The "simple rotation" is reordered ahead of the "simple X movement." The screens shown in FIGS. 14A and 14B are examples of the first UI object for setting an execution order of a plurality of types of visual effects. In this case, the composite image data includes information indicating the set execution order.

Figure 15A:
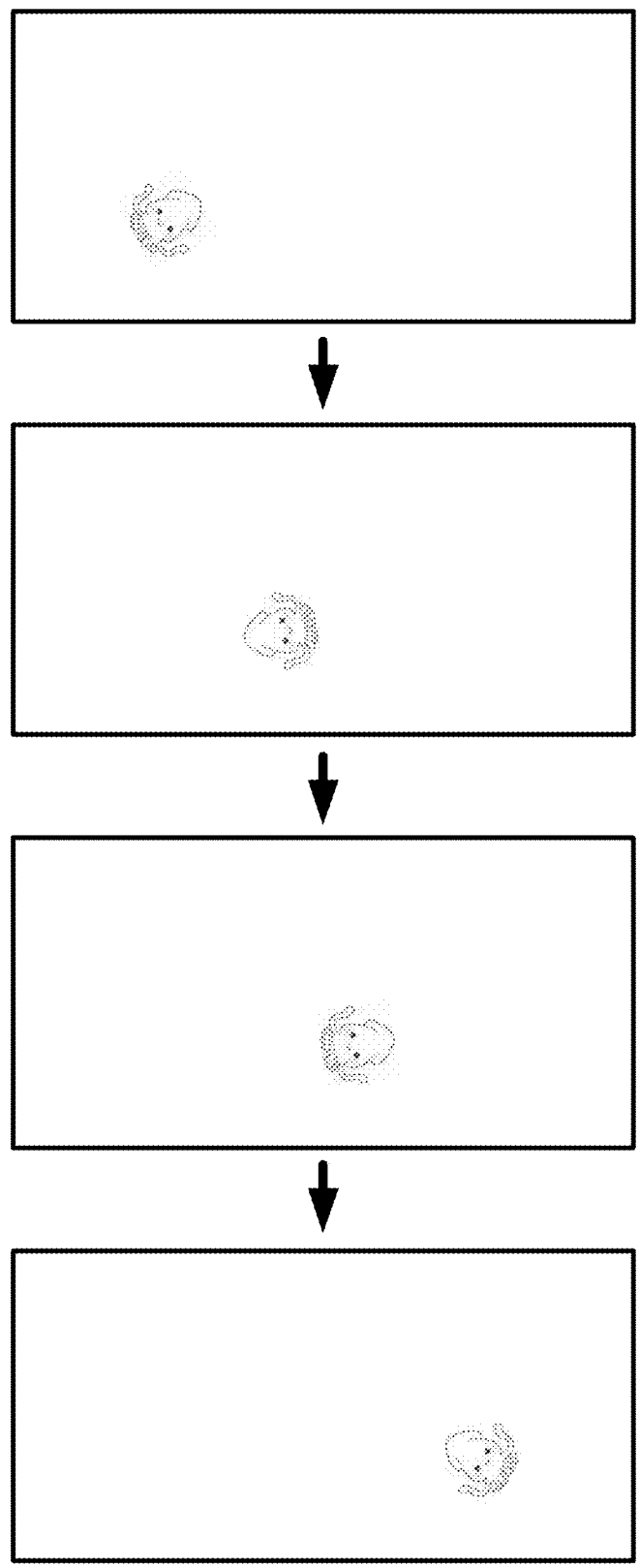
FIG. 15A shows an exemplary visual effect.
Figure 15B:
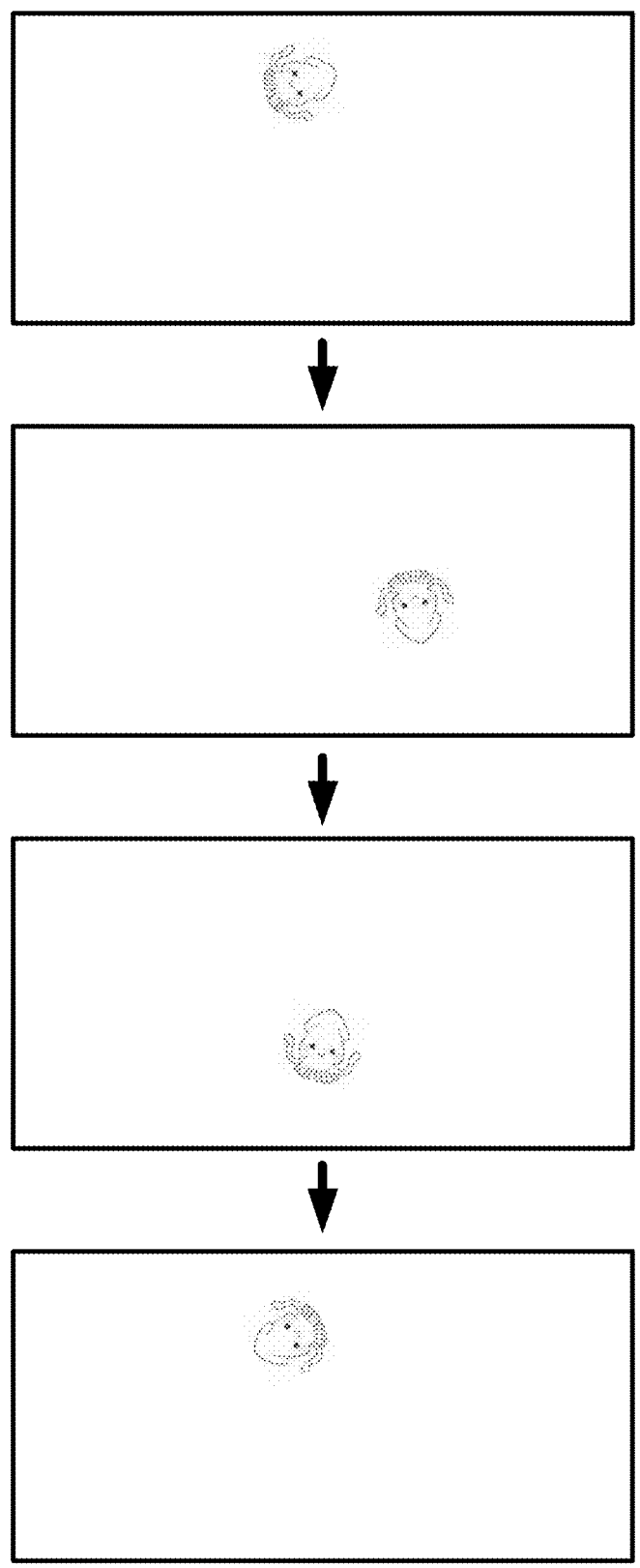
FIG. 15 B shows an exemplary visual effect.

FIGS. 15A and 15B show exemplary visual effects. FIG. 15A shows an example where the simple X-movement is applied first, and the simple-rotation is applied later, with respect to layer images L. FIG. 15B shows an example where the simple rotation is applied first, and the simple X movement is applied later. In this way, even when a combination of the same visual effects is used, depending on an order in which the effects are executed, the results obtained may be quite different. According to image display system 1, it is also possible to change the execution order of such visual effects.

Image display system 1 further includes a UI object for specifying a visual effect when generating the thumbnail image. In a case that a thumbnail image is generated by superimposing a plurality of layer images as in the present embodiment, if a thumbnail image is generated without due care being taken in superimposing the plurality of layer images an image may be generated that is inappropriate as a thumbnail image.

FIGS. 16A-16C show a problem in generating a thumbnail Image. FIG. 16A illustrates an example of a visual effect in a composite image. The composite image includes a layer image L[1] in which a woman writing on a document is shown, and a layer image L[2] in which a woman raises her right hand is shown. If the cursor pointer is at the left, the transmittance of layer image L[1] is minimum and the transmittance of layer image L[2] is maximum, and as the cursor pointer moves to the right, the transmittance of layer image L[1] increases and the transmittance of layer image L[2] decreases. If the cursor pointer is at the left end of the response area, only layer image L[1] is displayed, that is, the woman writing on the document is displayed (FIG. 16A: (A)). If the cursor pointer is in the center, transmittance of both layer image L[1] and layer image L[2] is 50%, and an image in which the right hand writing and the right hand raised overlap is displayed (FIG. 16A: (B)). If the cursor pointer is at the right end of the response area, only layer image L[2] is displayed, that is, a woman raising her right hand is displayed (FIG. 16A: (C)). In such a composite image, when an image in which layer image L[1] and layer image L[2] are simply superimposed, a thumbnail image results (FIG. 16A: (A)) in which the right hand writing and the right hand raised are superimposed in the thumbnail image. This is not as intended by of the creator of the of the composite image for use as a thumbnail image.

Image display system 1 includes, in UI object 921, a UI object for calling a UI object for specifying a visual effect in generating a thumbnail image. FIG. 16B illustrates an exemplary UI object for specifying a visual effect when a thumbnail image is generated. The UI object includes an area for previewing the thumbnail image It and an object P for specifying the position of the cursor pointer. The user can specify the position of the cursor pointer by dragging and dropping the object P. The thumbnail image It previewed in the UI object is an image obtained by reducing the actual composite image, but display control means 25 converts the position of the cursor pointer into the size of the actual composite image and specifies the value of the response amount of the visual effect. That is, the visual effect in the thumbnail image It changes in accordance with the position of the object P. The creator of the composite image determines the position Pt of the cursor pointer as the thumbnail image by pressing the OK button B, if the composite image with the visual effect in this condition is considered appropriate for the thumbnail image. Storage means 21 stores the position Pt of the cursor pointer as the position of the cursor pointer to be that of a thumbnail image. Further, storage means 21 stores, as a thumbnail image, an image obtained by thumbnailing a composite image having a visual effect corresponding to the position Pt of the cursor pointer. If the visual effect or the response value thereof is changed, display control means 25 stores, in storage means 21, the thumbnail image having the changed visual effect corresponding to the position Pt of the cursor pointer. FIG. 16B illustrates an example of a sixth UI that specifies an amount of user operation corresponding to a response amount of a visual effect when a thumbnail image is generated. In this instance, the composite image data includes information specifying an amount of user operation corresponding to a response amount of the visual effect when the thumbnail image is generated.

FIG. 16C shows another exemplary UI object for specifying visual effects when generating thumbnail images. In this embodiment, display control means 25 does not receive the designation of the position Pt of the cursor pointer from the object P, but rather receives the designation of the position Pt of the cursor pointer from a particular user action (for example, a double-click) on the thumbnail image It. Similar to the UI object shown in FIG. 16B, storage means 21 stores the position Pt that has received the particular user action as the position of the cursor pointer to be that of a thumbnail image. Further, storage means 21 stores, as a thumbnail image, an image obtained by thumbnailing a composite image having a visual effect corresponding to the position Pt. In other words, FIG. 16C shows another example of the sixth UI that designates an amount of user operation corresponding to the response amount of the visual effect when the thumbnail image is generated.

3-4. Viewing a Composite Image

Figure 17:
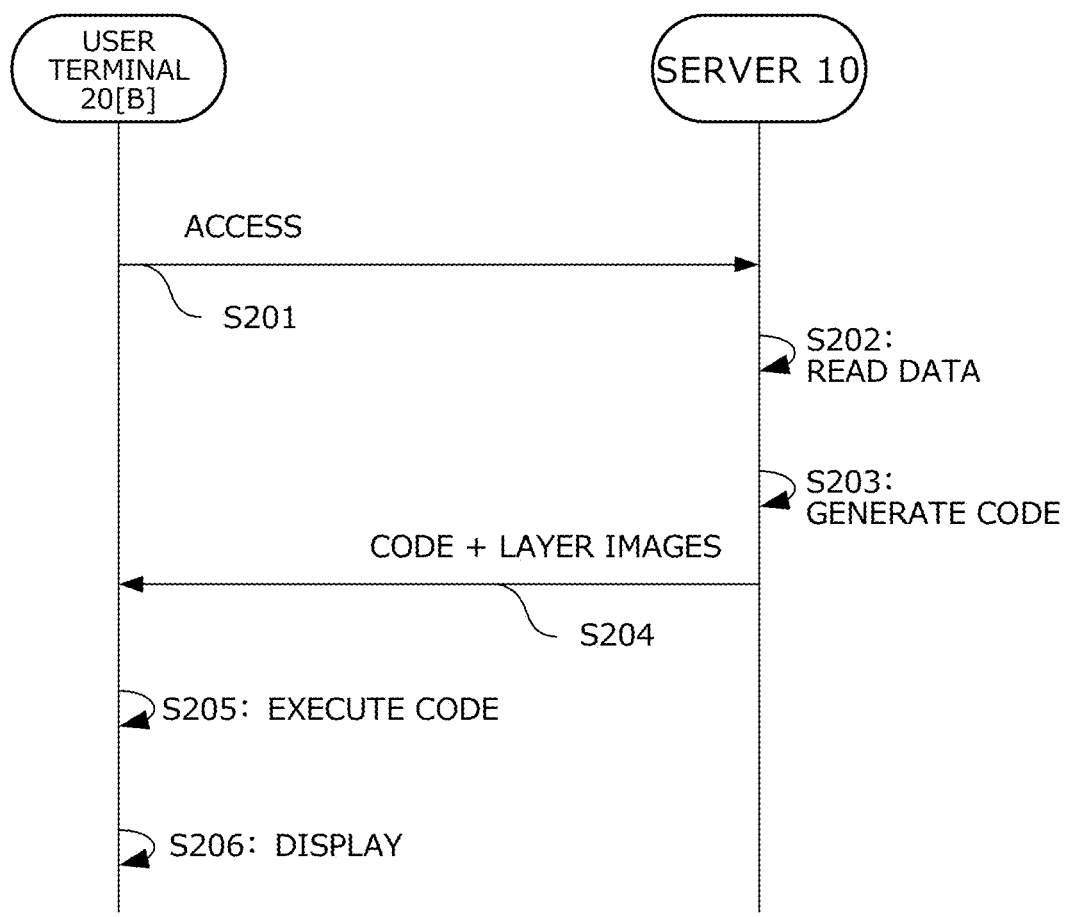
FIG. 17 shows an exemplary sequence chart illustrating an operation related to viewing a composite image.

FIG. 17 shows an exemplary sequence chart illustrating an operation related to viewing of a composite image. User terminal 20[B] accesses (at step S201) server 10 in response to an instruction from the user. In response to this access, server 10 transmits data to user terminal 20[B] for displaying the top screen of the image service. The top screen includes, for example, a service menu of an image service. The service menu includes items for searching a composite image and items for viewing the composite image. An item for searching a composite image includes a text box for inputting a search keyword and a search button for instructing a search start. If the user inputs a search keyword such as a creator name, a scene, or a character name into the search box and presses a search button, control means 19 extracts a composite image corresponding to the input keyword and presents the extracted composite image to user terminal 20[B]. The search result includes, for example, a list of thumbnail images of the composite image. If the user of user terminal 20[B] selects a composite image from among the presented composite images, generating means 13 reads (at step S202) the data of the selected composite image from database 111. Alternatively, if the user of user terminal 20[B] knows in advance the access destination (for example, URL) of a particular composite image (for example, by notification from the creator), user terminal 20[B] may directly access the access destination. The URL of the composite image is uniquely determined by combining, for example, a domain name for accessing server 10 and a word such as a composite image ID. In this instance, generating means 13 reads (at step S202) the data of the accessed composite image from database 111.

At step S203, generating means 13 generates data for displaying the composite images in user terminal 20 using the data read from the data base 111. In one example, the data includes code (or instructions) running on a client program in user terminal 20. The code includes information identifying a layer image and information indicating a content of a visual effect in each of a layer image. Specifically, in a case in which the client program is a general-purpose web browser program, the code is JavaScript (R) code. In another example, in an example where the client program is a dedicated application program, the data may be Java (R) code or code written in a proprietary format. If the JavaScript code is generated at step S105 and recorded in database 111, it is sufficient to read the data (i.e., code) from database 111 at step S203, and as a result it is not necessary to generate data at step S203. Communication means 16 transmits (at step S204) data for displaying the composite image, that is, the generated code and data of the plurality of layer images, to user terminal 20[B]. In user terminal 20[B], display control means 25 executes the code. By executing the code, the composite image is displayed (at step S205) on display means 23.

FIGS. 18A to 18E shows examples of a screen for displaying a composite image. The composite image illustrated here is an image obtained by stacking layer images L[1] to L[4] illustrated in FIG. 2. In the composite image, the visual effect of each layer changes according to a user action input via receiving means 24. Specifically, the visual effect of each layer changes in accordance with movement of the cursor pointer by the user action input via receiving means 24. If the user terminal 20[B] is a personal computer, the user action is a movement of the cursor pointer P by an operation input via a pointing device (e.g., a mouse). Alternatively, in a case that user terminal 20[B] is a smartphone, the user action is an operation of tilting the main body of the smartphone. In the latter case, the client program converts the inclination of the smartphone body into an input operation for the pointing device. Thus, when the user tilts user terminal 20[B], the visual effect of the composite image changes in accordance with a degree of tilt. In this case, the cursor pointer P may not be displayed on the display screen of the composite image.

Figure 18A:
FIG. 18A shows a n exemplary screen for displaying a composite image.
Figure 18B:
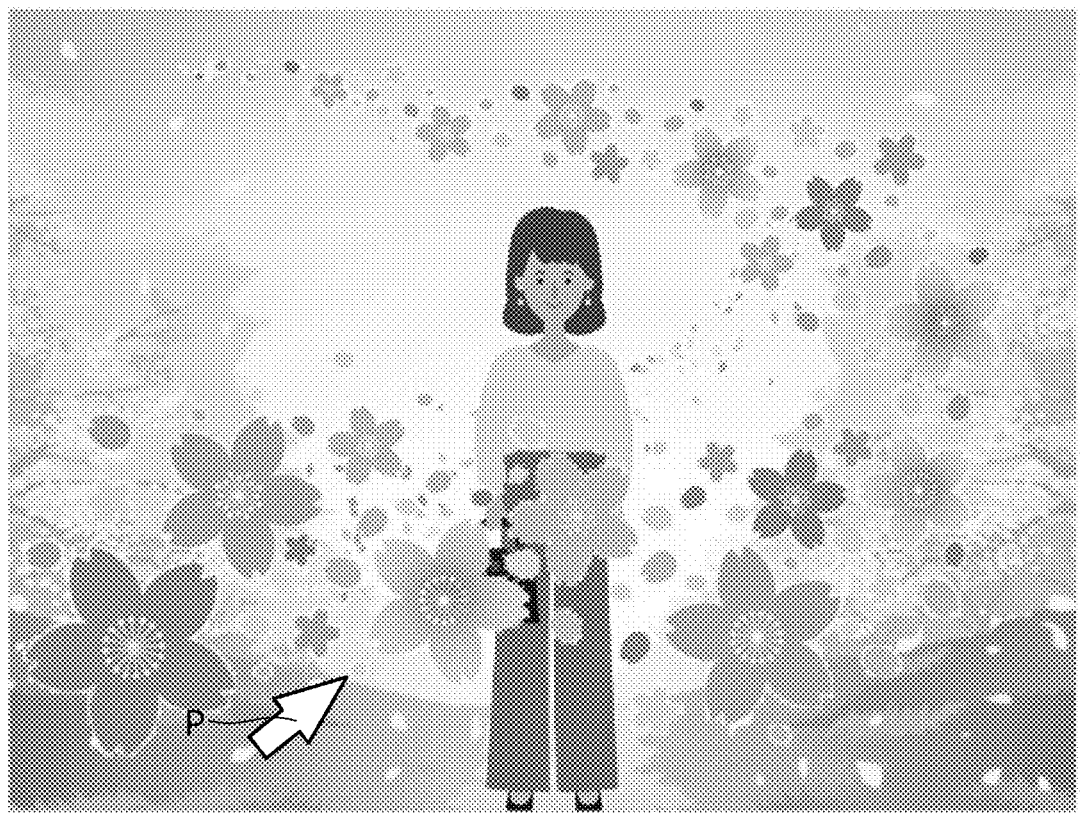
FIG. 18 B shows a n exemplary screen for displaying a composite image.
Figure 18C:
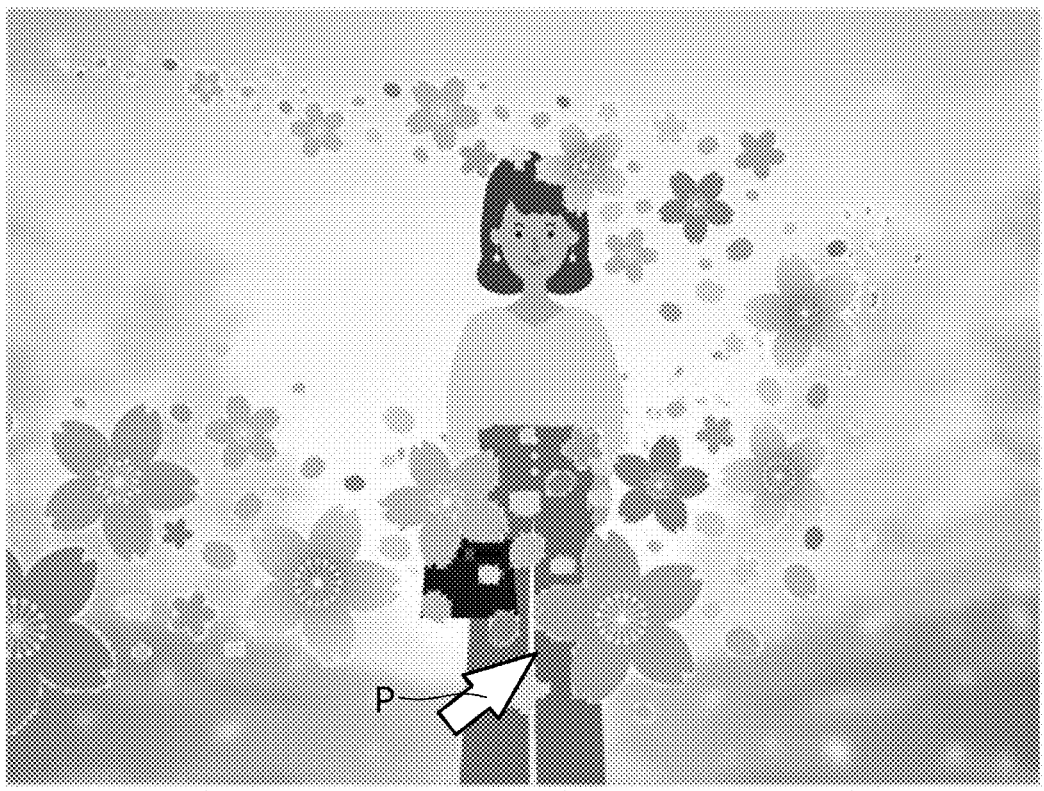
Figure 18D:
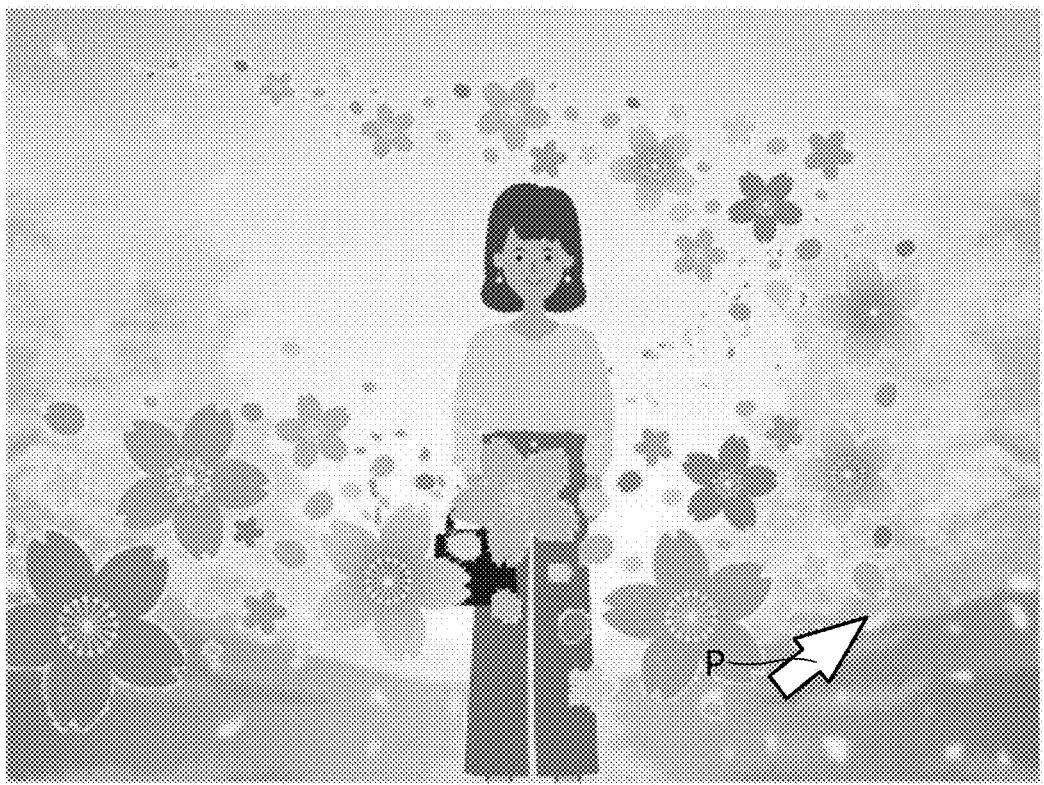
Figure 18E:

In this composite image, the interlocking direction of all the layer images is the X direction. FIG. 18A shows a state in which the cursor pointer is near the left edge of the picture, and FIG. 18E shows a state in which the cursor pointer is near the right edge. Layer L[1] becomes increasingly blurred as the cursor pointer approaches the center. Layer L[2] moves to the right as the cursor pointer approaches the center. Layer L[3] expands as the cursor pointer approaches the center. Layer L[4] moves to the left as the cursor pointer approaches the center. These visual effects can be combined to impart to the user an impression that the composite image as a whole is changing in a complex manner. It is of note that the user action during this period is, for example, simply moving the mouse from left to right or tilting the terminal from left to right, and no action is performed to select a specific layer from among layer images L[1]-L[4]. Further, since the visual effect is activated simultaneously in each of layer images L[1]-L[4], and not only in the selected specific layer image, regardless of the selection of the layer the visual effect is activated in all the layer images.

4. Modification

The present invention is not limited to the embodiments described above, and various modifications can be envisaged. Some variations will be described below. Some of the items described in the following modifications may be combined.

The specific UI images, visual effects, response areas, setting items, and response amount in the image-display device 1 are merely examples, and the present invention is not limited to the above-described embodiments. Part of the items exemplified in the embodiment may be omitted, or items other than the items exemplified in the embodiment may be added. For example, those described as separate UI objects in the embodiment may be integrated into one UI object.

The configuration of the work screen is not limited to that illustrated in the embodiment. In the embodiment, an example is described in which the work screen is divided into two areas, i.e., an area 91 for previewing a composite image and an area 92 for editing a visual effect, but the work screen may include only a screen corresponding to area 92, for example. In this case, the work screen may be switched to a screen corresponding to area 92 by a predetermined user operation (for example, pressing a predetermined button) in a state in which only area 91 is displayed on the work screen (the operation of the "screen is switched" here includes an example in which a window corresponding to area 92 pops up), or a superimposed window corresponding to area 92 may be displayed. That is, the work screen may include a UI object (for example, a button) for switching by a user a screen on which, for example, area 91 is displayed on a screen on which area 92 is displayed, or vice versa. Further, when area 91 and area 92 are both displayed on one screen, border lines between the two areas may be provided.

The screen configuration of area 92 is not limited to that illustrated in the embodiment. In the embodiment, an example in which a layer image and a setting item of a visual effect are displayed in a matrix in area 92 is described. However, for example, a list of layer images may be displayed in area 92, and when a desired layer image is selected, a screen for setting a visual effect related to the layer image may be opened in another window.

The method of dividing the response area is not limited to the one exemplified in the embodiment. Although an example is described in the embodiment in which the response area is divided into three areas along the X-axis, the response area may be divided into two areas or may be divided into four or more areas. In addition, the direction in which the response area is divided need not be the same as the interlocking direction. For example, when the interlocking direction is the X-direction, the response area may be divided along the Y-axis instead of the X-axis, or may be divided along both the X-axis and the Y-axis (that is, two-dimensionally). Alternatively, the response area may be treated as a single non-segmented area.

In the embodiment, a plurality of types of visual effects applicable to each layer image are prepared, and an example in which a user can select a visual effect desired to be applied to the layer image from among the plurality of visual effects is described. However, the visual effect may be a configuration that is specified in advance by image display system 1 for each layer image or for the entire composite image, and is not selected by the user. In this case, only a single visual effect may be applied in each layer image; and the visual effect setting screen (area 922 and the like in FIG. 12) related to layer image L need not need include a UI object for specifying a type of visual effect.

In the embodiment, an example in which a change in a visual effect is defined by a relative positional relationship between a reference position and a position of the cursor pointer (that is, an example in which the change amount of the visual effect is a function of the coordinates of the reference position and the coordinates of the cursor pointer and the difference) has been described. However, the method of changing the user action and the visual effect is not limited to that defined by the relative positional relationship between the reference position and the position of the cursor pointer. The change amount of the visual effect may be any amount as long as it is defined by the amount of user operation specified by the user action. For example, the change amount of the visual effect may be a function of an amount of inclination of a terminal or a function of a flick rate.

The specific method of setting the response amount of the visual effect is not limited to the method in which the user inputs a numerical value on the work screen. For example, image display system 1 may present the user with a list of presets or templates prepared by the user, another user, or by a system operator. The presets or template may be presented for use in a single layer image, or may be presented for use in multiple layer images (or the entire composite image).

The user selects a desired one of the presets or templates, and image display system 1 sets a response amount for each visual effect in accordance with the selected preset or template.

The hardware configuration of information processing system 1 is not limited to the example described in the above embodiment. Image display system 1 may have any hardware configuration as long as the required functions can be implemented. For example, plural physically cooperating devices may function as server 10. Server 10 may be a physical server or a virtual server (including so-called cloud computing).

In addition, the correspondence relationship between the functional elements and the hardware elements is not limited to that described in the embodiment. For example, at least some of the functions described as being implemented in server 10 in the embodiment may be implemented in user terminal 20. Specifically, functions corresponding to generating means 12, generating means 13, and receiving means 14 may be implemented in user terminal 20 as an application program. In this case, the application program (that is, user terminal 20) generates the data for displaying the composite image by itself (internally), and this data can be another example of the data for displaying the composite image. In particular, database 111 may be implemented in another server device separate from server 10. In addition, some of the functional elements illustrated in FIG. 2 may be omitted. Alternatively, some of the functions described as being implemented in user terminal 20 in the embodiment may be implemented in the server 10. Specifically, functions corresponding to receiving means 24, display control means 25, and receiving means 26 may be implemented in server 10 by the server program.

The programs executed by CPU 101, CPU 201, and the like may be provided by being downloaded via a network such as the Internet, or may be provided by being recorded in a non-transitory computer-readable storage medium such as a DVD-ROM (Digital Versatile Disk Read Only Memory), for example.

What is claimed is:

1. A computer implemented method comprising:
receiving via a user interface screen a first instruction to define a conversion coefficient for converting an amount of a user action of a user to a change amount in a visual effect for each of a plurality of layer images in a composite image, the composite image being configured by stacking the plurality of layer images, the visual effect being applied by converting the amount of the user action to the change amount in each of the plurality of layer images, the user action including no selection of any one of the plurality of layer images, the user action corresponding to information of a position in at least one dimension or information of a rotation angle about at least one axis, the information of the position or the information of the rotation angle corresponding to the user action being converted into a position in a space, in which each layer image of the plurality of layer images is placed, of the composite image, the position in the space giving the same amount of the user action to all of the plurality of layer images, the visual effect being applied to all of the plurality of layer images based on the amount of the user action and the conversion coefficient defined for each layer image of the plurality of layer images;
controlling a display device to display the composite image in which the visual effect is applied to the plurality of layer images simultaneously; and receiving a second instruction to store composite image data, the composite image data including the plurality of layer images or information indicating a location of the plurality of images and data indicating the conversion coefficient defined for each layer image of the plurality of layer images, wherein the space is spatially divided into a plurality of areas, and the visual effect for each area of the plurality of areas is activated when the position corresponding to the user action is within a corresponding area of the plurality of areas, the user interface screen includes a visual effect user interface object for receiving a visual effect instruction to define a content of the visual effect for each of the plurality of areas, and the second instruction is to store, for each area of the plurality of areas, the composite image data including the content.

2. The computer implemented method according to claim 1, wherein the visual effect includes a plurality of processes, the first instruction is to define the plurality of processes of the visual effect for each of the plurality of layer images, and the second instruction is to store the composite image data for which the visual effect is defined in accordance with the first instruction.

3. The computer implemented method according to claim 2, wherein the user interface screen includes a first user interface object for defining an execution order for executing the plurality of processes, and the second instruction is to store the composite image data including information showing the execution order.

4. The computer implemented method according to claim 1, wherein the user interface screen includes a first area and a second area, the first area is for preview of the composite image, and the second area is for editing the conversion coefficient.

5. The computer implemented method according to claim 4, wherein the user interface screen includes a border line between the first area and the second area, and the border line is movable in response to an operation made by the user.

6. The computer implemented method according to claim 4, wherein the user interface screen switches from a screen on which one of the first area and the second area is displayed to another screen on which the other of the first area and the second area is displayed, in response to an operation made by the user.

7. The computer implemented method according to claim 1, wherein the visual effect is configured with a plurality of effect items, the user interface screen includes a matrix having rows and columns, and the plurality of layer images are arranged on one of the rows and the columns in the matrix, and the plurality of effect items are arranged on the other of the rows and the columns in the matrix.

8. The computer implemented method according to claim 1, wherein the visual effect in one layer image among the plurality of layer images includes at least one of:

a process of moving the one layer image in accordance with a vector having at least one of a first axis, a second axis, and a third axis;

a process of rotating the one layer image about a rotation axis having at least one of the first axis, the second axis, and the third axis;

a process of enlarging the one layer image along the first axis or the second axis;

a process of changing transparency of the one layer image;

a process of changing hue of the one layer image;

a process of changing brightness of the one layer image;

a processing of changing saturation of the one layer image; and a process of changing sharpness of the one layer image.

9. The computer implemented method according to claim 1, wherein the visual effect is configured with a plurality of effect items, the user interface screen includes a second user interface object for receiving an instruction to define a content of each effect item of the plurality of effect items of the visual effect for each of the plurality of areas, and the second instruction is to store, for each area of the plurality of areas, the composite image data including identification information of each effect item of the plurality of effect items and the content.

10. The computer implemented method according to claim 1, wherein the user interface screen includes a third user interface object for defining a division position for each of the plurality of areas, and the second instruction is to store the composite image data including information indicating the division position.

11. The computer implemented method according to claim 1, wherein the user interface screen includes a fourth user interface object for defining the conversion coefficient of each area of the plurality of areas at a reference position thereof, and the second instruction is to store the composite image data including information indicating the conversion coefficient at the reference position.

12. The computer implemented method according to claim 1, wherein the user interface screen includes a fifth user interface object for defining a function for changing the conversion coefficient in each area of the plurality of areas, and the second instruction is to store the composite image data including information indicating the function.

13. The computer implemented method according to claim 1, wherein the user interface screen includes a sixth user interface object for specifying the amount of the user action and the conversion coefficient of the visual effect in generating a thumbnail image of the composite image, and the second instruction is to store the composite image data including information indicating the visual effect at the time of generating the thumbnail image.

14. The computer implemented method according to claim 1, wherein the plurality of layer images includes two layer images respectively having different sizes, the user interface screen includes a seventh user interface object for defining a positional relationship between the two different sized layer images, and the second instruction is to store the composite image data including information indicating the positional relationship.

15. An information processing device comprising:
a memory configured to store a program; and
a processor configured to execute the program so as to:
receive via a user interface screen a first instruction to define a conversion coefficient for converting an amount of a user action to a change amount in a visual effect for each of a plurality of layer images in a composite image, the composite image being configured by stacking the plurality of layer images, the visual effect being applied by converting the amount of the user action to the change amount in each of the plurality of layer images, the user action including no selection of one of the plurality of layer images, the user action corresponding to information of a position in at least one dimension or information of a rotation angle about at least one axis, the information of the position or the information of the rotation angle corresponding to the user action being converted into a position in a space, in which each layer image of the plurality of layer images is placed, of the composite image, the position in the space giving the same amount of the user action to all of the plurality of layer images, the visual effect being applied to all of the plurality of layer images based on the amount of the user action and the conversion coefficient defined for each layer image of the plurality of layer images;
control a display device to display the composite image in which the visual effect is applied to the plurality of layer images simultaneously; and
receive a second instruction to store composite image data, the composite image data including the plurality of layer images or information indicating a location of the plurality of images and data indicating the conversion coefficient defined for each layer image of the plurality of layer images, wherein
the space is spatially divided into a plurality of areas, and the visual effect for each area of the plurality of areas is activated when the position corresponding to the user action is within a corresponding area of the plurality of areas,
the user interface screen includes a visual effect user interface object for receiving a visual effect instruction to define a content of the visual effect for each of the plurality of areas, and
the second instruction is to store, for each area of the plurality of areas, the composite image data including the content.

16. A non-transitory computer-readable storage medium storing a program, the program causing a computer to execute a process by a processor so as to perform the steps of:
receiving via a user interface screen a first instruction to define a conversion coefficient for converting an amount of a user action to a change amount in a visual effect for each of a plurality of layer images in a composite image, the composite image being configured by stacking the plurality of layer images, the visual effect being applied by converting the amount of the user action to the change amount in each of the plurality of layer images, the user action including no selection of one of the plurality of layer images, the user action corresponding to information of a position in at least one dimension or information of a rotation angle about at least one axis, the information of the position or the information of the rotation angle corresponding to the user action being converted into a position in a space, in which each layer image of the plurality of layer images is placed, of the composite image, the position in the space giving the same amount of the user action to all of the plurality of layer images, the visual effect being applied to all of the plurality of layer images based on the amount of the user action and the conversion coefficient defined for each layer image of the plurality of layer images;
controlling a display device to display the composite image in which the visual effect is applied to the plurality of layer images simultaneously; and
receiving a second instruction to store composite image data, the composite image data including the plurality of layer images or information indicating a location of the plurality of images and data indicating the conversion coefficient defined for each layer image of the plurality of layer images, wherein
the space is spatially divided into a plurality of areas, and the visual effect for each area of the plurality of areas is activated when the position corresponding to the user action is within a corresponding area of the plurality of areas,
the user interface screen includes a visual effect user interface object for receiving a visual effect instruction to define a content of the visual effect for each of the plurality of areas, and
the second instruction is to store, for each area of the plurality of areas, the composite image data including the content.

17. A computer implanted method, comprising:
generating data of a user interface screen, the user interface screen receiving a first instruction to define a conversion coefficient for converting an amount of a user action to a change amount in a visual effect for each of a plurality of layer images in a composite image, the composite image being configured by stacking the plurality of layer images, the visual effect being applied by converting the amount of the user action to the change amount in each of the plurality of layer images, the user action including no selection of one of the plurality of layer images, the user action corresponding to information of a position in at least one dimension or information of a rotation angle about at least one axis, the information of the position or the information of the rotation angle corresponding to the user action being converted into a position in a space, in which each layer image of the plurality of layer images is placed, of the composite image, the position in the space giving the same amount of the user action to all of the plurality of layer images, the visual effect being applied to all of the plurality of layer images based on the amount of the user action and the conversion coefficient defined for each layer image of the plurality of layer images;
generating data for controlling a display device to display the composite image which the visual effect is applied to the plurality of layer images simultaneously; and
receiving a second instruction to store composite image data, the composite image data including the plurality of layer images or information indicating a location of the plurality of images and data indicating the conversion coefficient defined for each layer image of the plurality of layer images, wherein the space is spatially divided into a plurality of areas, and
the visual effect for each area of the plurality of areas is activated when the position corresponding to the user action is within a corresponding area of the plurality of areas,
the user interface screen includes a visual effect user interface object for receiving a visual effect instruction to define a content of the visual effect for each of the plurality of areas, and
the second instruction is to store, for each area of the plurality of areas, the composite image data including the content.

18. An information processing device comprising:
a memory configured to store a program; and
a processor configured to execute the program so as to:
generate data of a user interface screen, the user interface screen receiving a first instruction to define a conversion coefficient for converting an amount of a user action to a change amount in a visual effect for each of a plurality of layer images in a composite image, the composite image being configured by stacking the plurality of layer images, the visual effect being applied by converting the amount of the user action to the change amount in each of the plurality of layer images, the user action including no selection of one of the plurality of layer images, the user action corresponding to information of a position in at least one dimension or information of a rotation angle about at least one axis, the information of the position or the information of the rotation angle corresponding to the user action being converted into a position in a space, in which each layer image of the plurality of layer images is placed, of the composite image, the position in the space giving the same amount of the user action to all of the plurality of layer images, the visual effect being applied to all of the plurality of layer images based on the amount of the user action and the conversion coefficient defined for each layer image of the plurality of layer images;
generate data for controlling a display device to display the composite image in which the visual effect is applied to the plurality of layer images simultaneously; and
receive a second instruction to store composite image data, the composite image data including the plurality of layer images or information indicating a location of the plurality of images and data indicating the conversion coefficient defined for each layer image of the plurality of layer images, wherein
the space is spatially divided into a plurality of areas, and
the visual effect for each area of the plurality of areas is activated when the position corresponding to the user action is within a corresponding area of the plurality of areas,
the user interface screen includes a visual effect user interface object for receiving a visual effect instruction to define a content of the visual effect for each of the plurality of areas, and
the second instruction is to store, for each area of the plurality of areas, the composite image data including the content.

19. A non-transitory computer-readable storage medium storing a program, the program causing a computer to execute a process by a processor so as to perform the steps of:
generating data of a user interface screen, the user interface screen receiving a first instruction to define a conversion coefficient for converting an amount of a user action to a change amount in a visual effect for each of a plurality of layer images in a composite image, the composite image being configured by stacking the plurality of layer images, the visual effect being applied by converting the amount of the user action to the change amount in each of the plurality of layer images, the user action including no selection of one of the plurality of layer images, the user action corresponding to information of a position in at least one dimension or information of a rotation angle about at least one axis, the information of the position or the information of the rotation angle corresponding to the user action being converted into a position in a space, in which each layer image of the plurality of layer images is placed, of the composite image, the position in the space giving the same amount of the user action to all of the plurality of layer images, the visual effect being applied to all of the plurality of layer images based on the amount of the user action and the conversion coefficient defined for each layer image of the plurality of layer images;
generating data for controlling a display device to display the composite image in which the visual effect is applied to the plurality of layer images simultaneously; and
receiving a second instruction to store composite image data, the composite image data including the plurality of layer images or information indicating a location of the plurality of images and data indicating the conversion coefficient defined for each layer image of the plurality of layer images, wherein
the space is spatially divided into a plurality of areas, and
the visual effect for each area of the plurality of areas is activated when the position corresponding to the user action is within a corresponding area of the plurality of areas.

20. A computer implemented method comprising:
displaying a screen on a display device;
receiving an input of an amount of a user operation corresponding to a user action on the screen; and
controlling the display device to display a composite image in which a plurality of layer images are stacked, the composite image being displayed using data, the data defining a conversion coefficient for converting the amount of the user action to a change amount in a visual effect for each of the plurality of layer images in the composite image, the visual effect being applied by converting the amount of the user action to the change amount in each of the plurality of layer images, the user action including no selection of one of the plurality of layer images, the user action corresponding to information of a position in at least one dimension or information of a rotation angle about at least one axis, the information of the position or the information of the rotation angle corresponding to the user action being converted into a position in a space, in which each layer image of the plurality of layer images is placed, of the composite image, the position in the space giving the same amount of the user action to all of the plurality of layer images, the visual effect being applied to all of the plurality of layer images based on the amount of the user action and the conversion coefficient defined for each layer image of the plurality of layer images, wherein the space is spatially divided into a plurality of areas, and the visual effect for each area of the plurality of areas is activated when the position corresponding to the user action is within a corresponding area of the plurality of areas, and a content of the visual effect for each of the plurality of areas is defined for each area of the plurality of areas.

21. An information processing device comprising:
a memory configured to store a program; and
a processor configured to execute the program so as to:
cause a display device to display a screen thereon;
receive an input of an amount of a user operation corresponding to a user action on the screen; and
control the display device to display a composite image in which a plurality of layer images are stacked, the composite image being displayed using data, the data defining a conversion coefficient for converting the amount of the user action to a change amount in a visual effect for each of the plurality of layer images in the composite image, the visual effect being applied by converting the amount of the user action to the change amount in each of the plurality of layer images, the user action including no selection of one of the plurality of layer images, the user action corresponding to information of a position in at least one dimension or information of a rotation angle about at least one axis, the information of the position or the information of the rotation angle corresponding to the user action being converted into a position in a space, in which each layer image of the plurality of layer images is placed, of the composite image, the position in the space giving the same amount of the user action to all of the plurality of layer images, the visual effect being applied to all of the plurality of layer images based on the amount of the user action and the conversion coefficient defined for each layer image of the plurality of layer images, wherein the space is spatially divided into a plurality of areas, and the visual effect for each area of the plurality of areas is activated when the position corresponding to the user action is within a corresponding area of the plurality of areas, and a content of the visual effect for each of the plurality of areas is defined for each area of the plurality of areas.

22. A non-transitory computer-readable storage medium storing a program, the program causing a computer to execute a process by a processor so as to perform the steps of:

displaying a screen on a display device;
receiving an input of an amount of a user operation corresponding to a user action on the screen; and
controlling the display device to display a composite image in which a plurality of layer images are stacked, the composite image being displayed using data, the data defining a conversion coefficient for converting the amount of the user action to a change amount in a visual effect for each of the plurality of layer images in the composite image, the visual effect being applied by converting the amount of the user action to the change amount in each of the plurality of layer images, the user action including no selection of one of the plurality of layer images, the user action corresponding to information of a position in at least one dimension or information of a rotation angle about at least one axis, the information of the position or the information of the rotation angle corresponding to the user action being converted into a position in a space, in which each layer image of the plurality of layer images is placed, of the composite image, the position in the space giving the same amount of the user action to all of the plurality of layer images, the visual effect being applied to all of the plurality of layer images based on the amount of the user action and the conversion coefficient defined for each layer image of the plurality of layer images, wherein the space is spatially divided into a plurality of areas, and the visual effect for each area of the plurality of areas is activated when the position corresponding to the user action is within a corresponding area of the plurality of areas, and a content of the visual effect for each of the plurality of areas is defined for each area of the plurality of areas.

* * * * *